US011512795B2

(12) United States Patent
Fitzgerald et al.

(10) Patent No.: US 11,512,795 B2
(45) Date of Patent: Nov. 29, 2022

(54) NOISE ABATEMENT IN A VENTURI VALVE

(71) Applicant: Honeywell International Inc., Charlotte, NC (US)

(72) Inventors: Christopher Fitzgerald, Harvard, MA (US); David Boisvert, North Chelmsford, MA (US); Leolein Moualeu, Haverhill, MA (US); Lloyd Nghi Trong Le, Braintree, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/214,133

(22) Filed: Mar. 26, 2021

(65) Prior Publication Data
US 2022/0307625 A1  Sep. 29, 2022

(51) Int. Cl.
*F16K 47/16* (2006.01)
*F16K 1/38* (2006.01)
*F16K 47/04* (2006.01)

(52) U.S. Cl.
CPC ........... *F16K 47/16* (2013.01); *F16K 1/38* (2013.01); *F16K 47/04* (2013.01); *Y10T 137/3367* (2015.04)

(58) Field of Classification Search
CPC . F16K 47/16; F16K 1/38; F16K 47/04; Y10T 137/3367
USPC ........................................................ 251/124
See application file for complete search history.

(56) References Cited

U.S. PATENT DOCUMENTS

| 1,635,040 | A | * | 7/1927 | Fales | ......................... G01F 1/44 200/83 B |
| 2,715,359 | A | | 8/1955 | Mackintosh et al. | |
| 2,796,889 | A | | 6/1957 | Treganowan et al. | |
| 2,856,992 | A | | 10/1958 | Bartels | |
| 2,917,077 | A | | 12/1959 | Ziege | |
| 3,015,469 | A | | 1/1962 | Falk | |
| 3,204,664 | A | | 9/1965 | Gorchev et al. | |

(Continued)

FOREIGN PATENT DOCUMENTS

| CN | 102459986 A | 5/2012 |
| CN | 105257830 A | 1/2016 |

(Continued)

OTHER PUBLICATIONS

® Antec Controls by Price, Venturi Valve, Catalog, v103, Price Industries Limited, Canada, 8 pages, 2021.

*Primary Examiner* — Daphne M Barry
*Assistant Examiner* — Frederick D Soski
(74) *Attorney, Agent, or Firm* — Seager, Tufte & Wickhem, LLP

(57) ABSTRACT

A venturi valve having a valve housing that includes a narrowing section extending between a broader upstream end and a narrower valve throat followed by a broadening section downstream of the valve throat, and a valve member configured to be situated in the valve housing and movable along a valve axis in an axial direction of the valve housing. The venturi valve includes a plurality of flow influencing features positioned in a reattachment region of the valve member and/or extending inward from an inner wall of the valve housing. The plurality of flow influencing features are configured to reduce perturbations in an air flow passing through the venturi valve thereby reducing rattle from the venturi valve.

20 Claims, 29 Drawing Sheets

(56) References Cited

U.S. PATENT DOCUMENTS

| | | | |
|---|---|---|---|
| 3,276,480 A | 10/1966 | Kennedy | |
| 3,592,222 A | 7/1971 | Goss et al. | |
| 3,592,240 A * | 7/1971 | Hedrick | F24F 13/16 251/212 |
| 3,703,273 A * | 11/1972 | Illing | F16K 47/04 138/46 |
| 3,791,764 A * | 2/1974 | Summer | F04F 5/50 417/179 |
| 4,009,826 A * | 3/1977 | Walker | G05D 7/0126 137/504 |
| 4,015,336 A * | 4/1977 | Johnson | A61C 17/08 433/95 |
| 4,080,982 A * | 3/1978 | Maezawa | F16K 3/32 137/219 |
| 4,092,999 A * | 6/1978 | Rubrich | G05D 7/0133 521/902 |
| 4,117,859 A * | 10/1978 | Illy | F16K 1/123 137/219 |
| 4,155,289 A | 5/1979 | Garriss | |
| 4,215,627 A | 8/1980 | Garriss | |
| 4,228,822 A | 10/1980 | Fisher | |
| 4,383,553 A * | 5/1983 | Platt | F16K 47/02 138/46 |
| RE31,475 E * | 12/1983 | Edmonston | F02M 9/06 261/44.3 |
| 4,453,561 A * | 6/1984 | Sands | F16K 15/063 137/543.13 |
| 4,473,091 A * | 9/1984 | Stoves | F16K 39/02 251/282 |
| 4,565,210 A * | 1/1986 | Heine | F16K 1/12 137/219 |
| 4,651,768 A * | 3/1987 | Epe | F16K 1/123 137/220 |
| 4,770,212 A | 9/1988 | Wienck | |
| 4,971,730 A * | 11/1990 | Edmonston | F02M 9/06 261/44.3 |
| 5,385,505 A | 1/1995 | Sharp et al. | |
| 5,435,337 A * | 7/1995 | Kemp | F16K 37/0066 137/220 |
| 5,479,812 A | 1/1996 | Juntunen et al. | |
| 5,651,529 A * | 7/1997 | Lieb | F16K 47/14 251/127 |
| 5,934,553 A * | 8/1999 | Fournier | G05D 23/022 137/219 |
| 6,549,826 B1 | 4/2003 | Pouchak et al. | |
| 7,543,759 B2 | 6/2009 | George | |
| 7,653,459 B2 | 1/2010 | Pouchak et al. | |
| 7,942,625 B2 * | 5/2011 | Sirakov | F04D 29/4213 415/58.4 |
| 8,141,849 B1 * | 3/2012 | Blume | F16K 1/38 137/516.29 |
| 8,517,051 B2 | 8/2013 | Fazekas et al. | |
| 9,243,735 B2 * | 1/2016 | Holmgren | B64D 13/00 |
| 9,255,721 B2 * | 2/2016 | Donohue | F24F 11/74 |
| 9,772,042 B2 * | 9/2017 | Boisvert | G05D 7/0133 |
| 10,161,528 B2 * | 12/2018 | Shen | F16K 1/427 |
| 10,208,563 B2 * | 2/2019 | Volent | E21B 34/00 |
| 2002/0162589 A1 | 11/2002 | Lorch et al. | |
| 2005/0045239 A1 * | 3/2005 | Krieger | B62D 5/062 138/44 |
| 2005/0199288 A1 | 9/2005 | Scholten | |
| 2005/0199840 A1 * | 9/2005 | Brinks | F16K 47/00 251/124 |
| 2008/0083463 A1 | 4/2008 | Fazekas et al. | |
| 2008/0282717 A1 * | 11/2008 | Yukimoto | F16K 47/12 251/126 |
| 2011/0017306 A1 * | 1/2011 | Husveg | F16K 3/26 251/309 |
| 2012/0118408 A1 | 5/2012 | Holmgren | |
| 2012/0270493 A1 | 10/2012 | Oliver et al. | |
| 2013/0068313 A1 | 3/2013 | George et al. | |
| 2013/0207011 A1 * | 8/2013 | Zeng | F16K 31/1225 251/62 |
| 2014/0021383 A1 * | 1/2014 | Yli-Koski | F16K 47/02 138/40 |
| 2014/0284508 A1 | 9/2014 | Nesbitt et al. | |
| 2016/0010752 A1 | 1/2016 | Boisvert et al. | |
| 2016/0333663 A1 * | 11/2016 | Volent | F16K 25/04 |
| 2019/0011060 A1 * | 1/2019 | Norberg | F16K 47/04 |
| 2019/0309858 A1 * | 10/2019 | Nowell | F04B 1/0452 |
| 2020/0018406 A1 * | 1/2020 | Goode | F16K 11/07 |
| 2020/0041005 A1 * | 2/2020 | Baumann | F16K 1/12 |

FOREIGN PATENT DOCUMENTS

| | | |
|---|---|---|
| CN | 102459986 B | 2/2017 |
| CN | 109386637 A | 2/2019 |
| WO | 2008043093 A2 | 4/2008 |
| WO | 2008043093 A3 | 4/2008 |
| WO | 2020069614 A1 | 4/2020 |

* cited by examiner

NOISE ABATEMENT IN A VENTURI VALVE

TECHNICAL FIELD

The present disclosure relates generally to HVAC (Heating, Ventilation and/or Air Conditioning) systems, and more particularly, to systems and methods for reducing rattling noises radiating from venturi valves used in HVAC systems.

BACKGROUND

HVAC (Heating, Ventilation and/or Air Conditioning) systems often include venturi valves for regulating the amount of airflow through airducts that lead to various rooms, zones or other areas of a building. Venturi valves typically include a valve member movable within a valve housing. The valve housing defines a venturi restriction, which is often hourglass shaped. The position of the valve member within the valve housing determines the valve's restriction to airflow, and thus determines the amount of airflow that passes through the venturi valve.

In some cases, the valve member includes a bias mechanism, such as a spring, that is compressed by an amount that is dependent on the incoming air pressure of the incoming airflow, which slides the valve member along a valve member support toward the venturi restriction in the valve housing. This restricts the airflow that flows through the venturi valve with increasing incoming air pressure. When so provided, the airflow through the venturi valve may be largely independent of the incoming air pressure, which allows the venturi valve to deliver a relatively constant airflow into a room, zone or other area even when the pressure of the incoming airflow significantly varies.

In some cases, such venturi valves, particularly larger sized valves, can produce a rattling noise over a significant portion of the valve range of airflows and pressures. This is believed to be caused by vortices that form in the airflow around the valve member. The alternating shedding of these vortices is believed to induce lateral vibration in the valve member, causing the valve member to vibrate against the valve member support causing a rattling noise. As such, during normal operation, a conventional venturi valve will often radiate a rattling noise at higher flowrates, which can be amplified within the ductwork of the HVAC system. What would be desirable is a method and system that allows the venturi valve to operate at higher flowrates while eliminating or substantially decreasing any audible noise emanating from the venturi valve.

SUMMARY

The present disclosure relates generally to HVAC systems and more particularly to systems and methods for reducing rattling noises radiating from venturi valves used in HVAC systems. In one example, a venturi valve includes a valve housing that has a narrowing section extending between a broader upstream end and a narrower valve throat. A valve member is situated in the valve housing and movable along a valve axis in an axial direction of the valve housing. The valve member may have a length extending in the axial direction of the valve housing, and a width extending in a direction transverse to the axial direction of the valve housing. The valve member may include a maximum width region that defines a maximum width of the valve member. The valve member may define a reattachment region downstream of the maximum width region, wherein the reattachment region may be configured to cause air flowing over the maximum width section to reattach to the valve member in the reattachment region.

In another example, a valve housing for a venturi valve may include a narrowing section extending between a broader upstream end and a narrower valve throat followed by a broadening section downstream of the valve throat. The narrowing section, the valve throat and the broadening section are defined by an inner wall of the valve housing. The valve housing may include a plurality of flow influencing features that extend inward from the inner wall of the valve housing at the valve throat and/or in the broadening section of the valve housing. The plurality of flow influencing features may be configured to reduce perturbations in an air flow passing along the inner wall of the valve housing.

In another example, a venturi valve may include a valve housing that has a narrowing section extending between a broader upstream end and a narrower valve throat followed by a broadening section downstream of the valve throat. The narrowing section, the valve throat and the broadening section may be defined by an inner wall of the valve housing. The venturi valve may include a valve member that is configured to be situated in the valve housing and is movable along a valve axis in an axial direction of the valve housing. The valve member may have a length extending in the axial direction of the valve housing and a width extending in a direction transverse to the axial direction of the valve housing. The venturi valve may include one or more of: (1) the valve member has a maximum width region that defines a maximum width of the valve member, and a reattachment region downstream of the maximum width region, wherein the reattachment region is configured to cause air flowing over the maximum width section to reattach to the valve member in the reattachment region; and (2) the valve housing includes a plurality of flow influencing features extending inward from the inner wall of the valve housing at the valve throat and/or in the broadening section of the valve housing, wherein the plurality of flow influencing features are configured to reduce perturbations in an airflow passing along the inner wall of the valve housing.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 25 is a graph illustrating points of audible rattling and no rattling at various flow rates and differential pressure of the valve throat as in FIG. 14;

Figure 1:
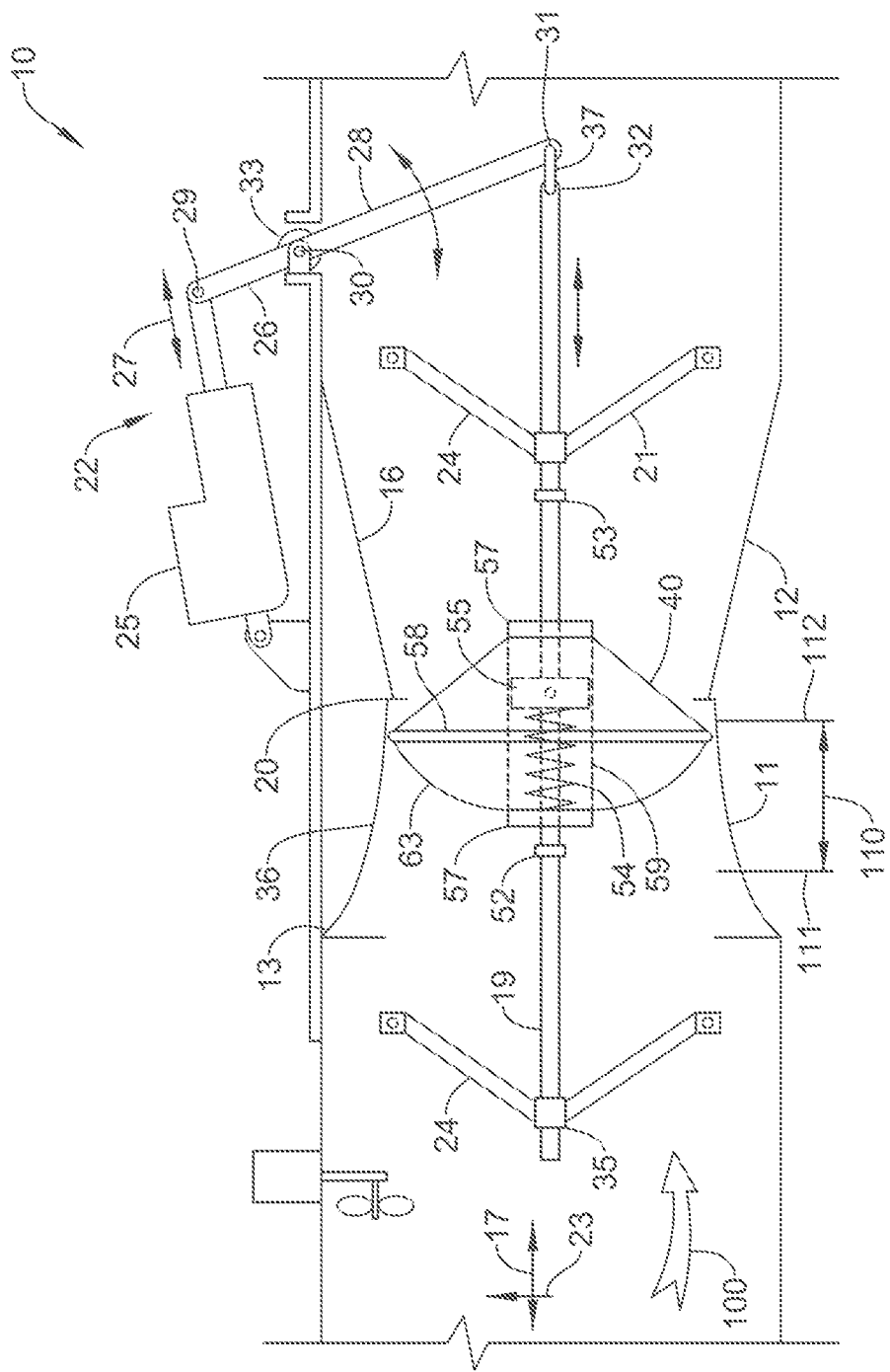
FIG. 1 is a schematic side view of an example venturi valve for use in an HVAC system, wherein a valve member of the venturi valve is shown in a position of minimum air flow.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

The present disclosure relates generally to HVAC (Heating, Ventilation, and/or Air Conditioning) systems and more particularly, to systems and methods for reducing rattling noises radiating from venturi valves used in HVAC systems. Some examples of venturi-style valves include the Accel-2 Venturi valve by Phoenix Controls, the Supreme Air Venturi by EH Price, the Triatek valve, and the Venturi FX valve by Antec Controls.

In some examples, an HVAC system may include a blower, at least one supply airduct, a return airduct, at least one VAV (variable air volume valve), such as a venturi valve as discussed herein, and a controller (e.g., a computing system). Air discharged from an outlet of the blower flows through the supply airduct through one or more valves, into a comfort zone (e.g., a room, area or space within a building), through the return airduct, and then back to a suction inlet of the blower to perpetuate the cycle. The controller may control the opening of each valve to adjust the amount of airflow delivered to the comfort zone. The controller may also control the blower and/or one or more other HVAC components of the HVAC system.

FIG. 1 is a schematic side view of an example venturi valve 10 that may be used in an HVAC (Heating, Ventilation, and/or Air Conditioning) system, wherein a valve member 40 of the venturi valve 10 is shown in a position of minimum air flow. The HVAC system (not shown) may include any apparatus or collection of devices use for heating, ventilating, cooling, filtering, humidifying, dehumidifying, blowing, compressing, regulating, and/or conveying air. The venturi valve 10, which may be an example of a VAV valve (variable air volume valve), may include any device for adjusting or modulating air flow. In some examples, as shown in FIG. 1, the venturi valve 10 may be used in the HVAC system for delivering air to a comfort zone (e.g., a room, zone, area or space within a building).

In some examples, and with reference to FIG. 1, the venturi valve 10 may include a valve housing 12 with a curved nozzle section 36 extending between a broader upstream end 13 and a narrower downstream end 11, a valve member 40 movable in an axial direction 17 through the nozzle section 36, a valve member support shaft 19 (e.g., rod, bar, tube, etc.) extending through the valve member 40, at least one bracket 21 attached to the housing 12 for supporting the shaft 19 and the valve member 40, a valve throat 20 at the narrower downstream end 11 of nozzle section 36, and an actuator system 22 for moving the position of valve member 40 within nozzle section 36 to adjust the airflow 100 through the valve 10. Some examples of the housing 12 are made of sheet metal formed in a generally hourglass shape (e.g., round or rectangular cross-section).

In the illustrated example of FIG. 1, the bracket 21 includes a plurality of spoke-like arms 24 extending in a radial direction 23 between the shaft 19 and an inner wall 16 of the housing 12. A hub-like central sleeve 35 of the bracket 21 provides the shaft 19 with radial support yet has sufficient clearance to allow the actuator system 22 to slide the shaft 19 in the axial direction 17 relative to the sleeve 35 and the housing 12. The shaft 19 is coupled to the valve member 40, so the actuator system 22 can move the valve member 40 by moving the shaft 19.

In some examples, the actuator system 22 comprises an actuator 25 and a linkage 26. The linkage 26 mechanically couples the actuator 25 to shaft 19. The term, "actuator" refers to any apparatus capable of moving the valve member 40. Some examples of the actuator 25 include an electric motor, a servomotor, a stepper motor, a universal motor, a brushless DC motor, a linear motor, a pneumatic cylinder, a bellows, a drive screw, a roller chain, a cogged belt, a spring, and various combinations thereof, etc. The term, "linkage" refers to any structure capable of directly or indirectly transmitting a force 27 from the actuator 25 to move the valve member 40. Some examples of a linkage 26 include a lever arm 28; one or more pivotal connections 29, 30, 31, and 32; a link 37 between the lever arm 28 and the shaft 19; a chain, a cable, a rod, a spring, and various combinations thereof.

In some examples, a position sensor 33 is operatively coupled to the lever arm 28 of the actuator system 22. The position sensor 33 provides a controller (not shown) with a feedback signal that indicates the position of the valve member 40. With reference to the feedback signal, the controller provides an output signal that commands the actuator 25 to move the valve member 40 to various desired positions such as a commanded position.

The term, "position sensor" refers to any device for monitoring a movable member's location, wherein the device provides a feedback signal that varies in response to changes in the member's location, and thereby provides at least some indication of the member's position. Some examples of such movable members include linkage 26, actuator 25, shaft 19, valve member 40, etc. Some examples of position sensor 33 include a potentiometer coupled to the lever arm 28 for sensing its angular position, an encoder, a resolver, a pulse counter, a Hall effect sensor, one or more electromechanical limit switches, a proximity sensor, etc.

In some examples, the valve member 40 is rigidly attached to the shaft 19, so the two may move as a unit. In the illustrated example, however, the valve member 40 is coupled to the shaft 19 in a resilient way that allows some limited axial movement between the valve member 40 and the shaft 19. Such movement allows the valve member 40 to automatically shift its placement on the shaft 19 in response to changes in static air pressure across the valve member 40. This enables the venturi valve 10 to automatically compensate for changes in static air pressure without the actuator 25 having to make such corrections. So, under some varying pressure conditions (e.g., 0.3 to 3 inches static water column), the actuator 25 and the shaft 19 can remain substantially stationary while a change in static pressure automatically adjusts the position of the valve member 40 to maintain a substantially constant volume of airflow through the valve 10.

In the illustrated example, the venturi valve 10 includes a spring 54, a spring collar 55, and a cylinder 59 disposed within the valve member 40; two end caps 57 attached to the valve member 40; an upstream collar 52 on the shaft 19; and a downstream collar 53 on the shaft 19. In some examples, the valve member 40 includes a valve seal 58 that can seal upon valve throat 20 at the narrower downstream end 11 of the nozzle section 36.

Collars 52 and 53 are spaced apart and affixed to the shaft 19. End caps 57 on the valve member 40 are in slip-fit relationship with the shaft 19. This provides the valve member 40 with the freedom to slide axially along the shaft 19 within the stopping limits of collars 52 and 53.

The spring 54 and the spring collar 55 provide an axially resilient connection between the valve member 40 and the shaft 19. In the illustrated example, the spring 54 is a compression spring with one end connected to one of the end caps 57. The spring's other end connects to spring collar 55. The cylinder 59 provides the spring 54 with radial support. The spring collar 55 is affixed to the shaft 19. Axial movement of the shaft 19 is transmitted to the spring collar 55, the spring 54, and one end cap 57; and the valve member 40 moves in response to movement of the shaft 19.

In addition, the resilience of the spring 54 provides the valve member 40 with some freedom to move while the shaft 19 is stationary. Such relative movement enables the valve member 40 to slide along the shaft 19 toward a more closed position in response to an increase in a delta static pressure across the valve member 40. Conversely, the valve member 40 can move toward a more open position in response to a decrease in delta static pressure.

FIG. 1 shows an approved operational airflow range 110 extending between a minimum airflow 112 and a maximum airflow 111. The term, "approved operational airflow range" refers to a predetermined normal range of operation. As for the minimum airflow 112 and maximum airflow 111, the terms, "minimum" and "maximum" refer to predetermined values and not necessarily absolute values. For example, the position of a valve can be adjusted over a predetermined approved range (normal operating range) between predetermined minimum and maximum positions, yet in some cases it is still possible to move the valve beyond the approved range, i.e., greater than the predetermined maximum or less than the predetermined minimum, but this is not required.

Figure 2:
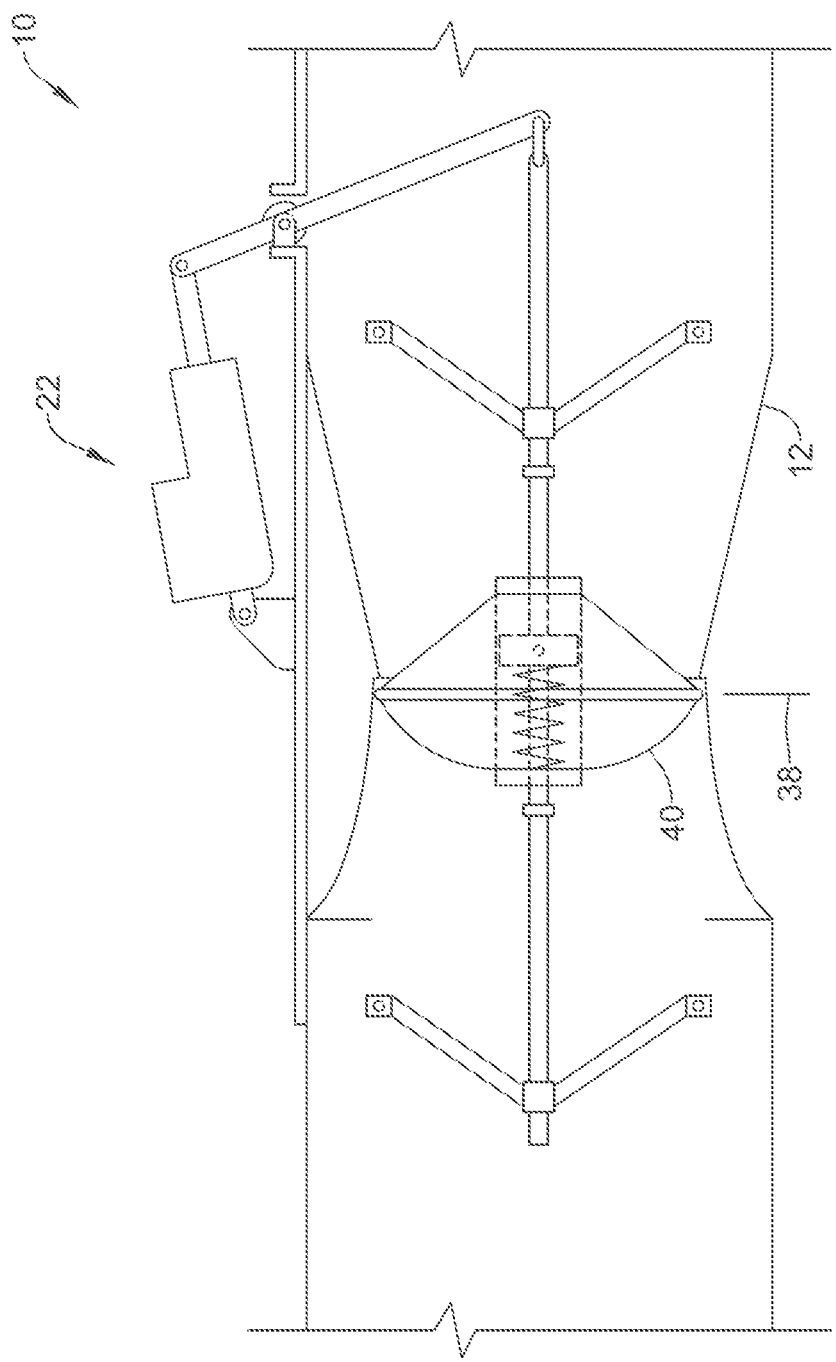
FIG. 2 is a schematic side view similar to FIG. 1, showing the valve member at a minimum open position.

FIG. 2 is a schematic side view similar to FIG. 1, but shows the valve member 40 at a minimum open position 38. In the illustrated example, the minimum open position 38 is closer to being fully closed than when the venturi valve 10 is configured for minimum airflow 112 (FIG. 1). So, in the example shown in FIG. 2, the minimum open position 38 is less than the approved operational airflow range 110. In other examples, however, the minimum open position 38 is right at the minimum airflow 112 (FIG. 1) and thus is within the approved operational airflow range 110.

Figure 3:
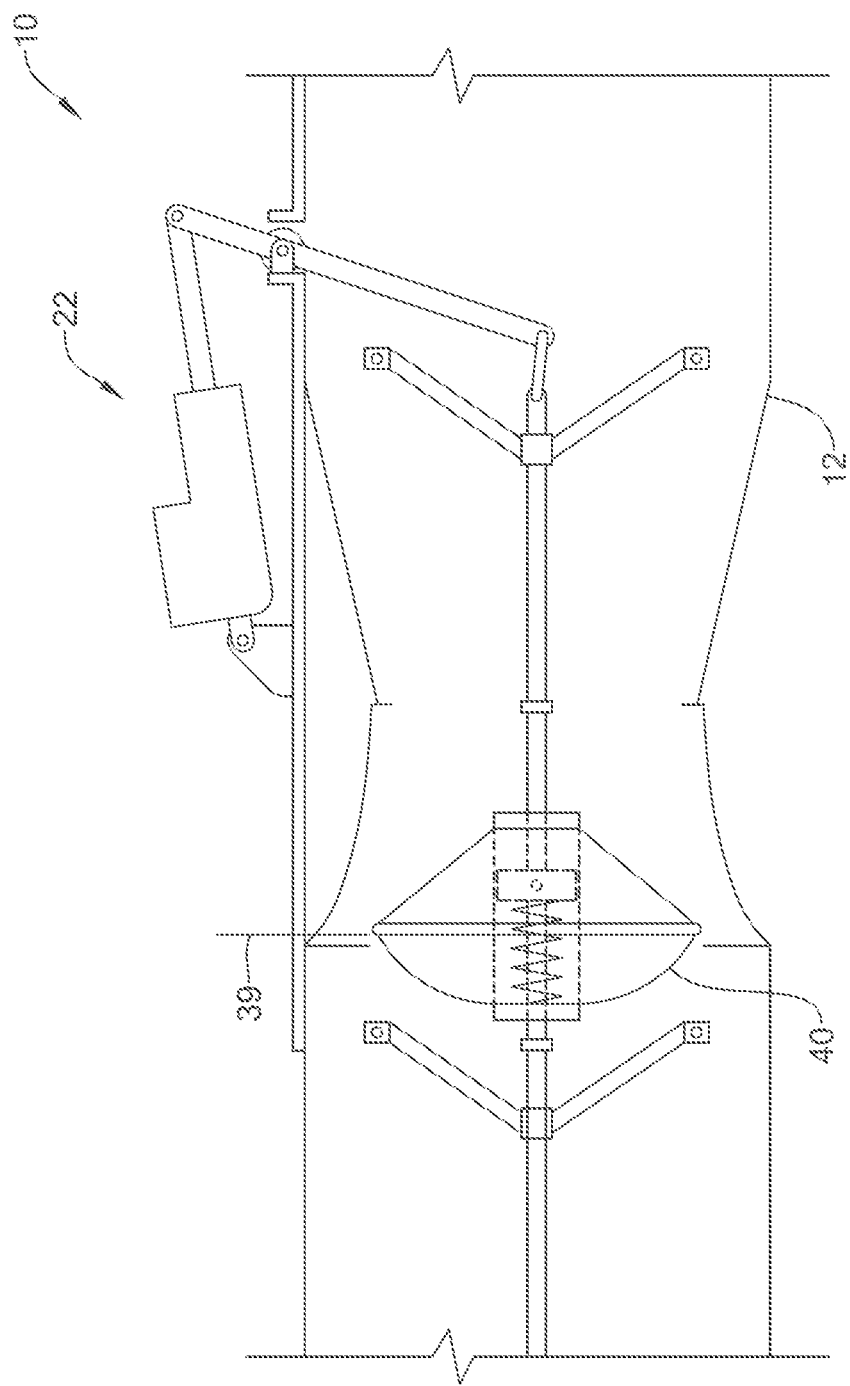
FIG. 3 is a schematic side view similar to FIG. 1, showing the valve member at a maximum open position.

FIG. 3 is a schematic side view similar to FIG. 1, but shows the valve member 40 at a maximum open position 39. In the illustrated example, maximum open position 39 is more open than when the venturi valve 10 is configured for maximum airflow 111 (FIG. 1). So, in the example shown in FIG. 3, the maximum open position 39 is beyond the approved operational airflow range 110. In other examples, however, the maximum open position 39 is right at the maximum airflow 111, and thus is within the approved operational airflow range 110.

During use, airflow engages an upstream cone 63 of the valve member 40 and is diverted towards a maximum width region of the valve member. This airflow is accelerated toward the maximum width region, and then abruptly decelerates as it passes the maximum width region. While the velocity decreases, the air pressure increases in a region outside of a boundary layer that extends along the surface of the valve member 40. Since the variation of pressure across the boundary layer is significant, air particles within the boundary layer experience relatively larger deceleration to the point of changing the direction of the air flow near the surface of the valve member 40. The air flow separation from the surface of the valve member 40 introduces vortices in the wake that forms downstream of the maximum width region of the valve member 40. The alternating shedding of these vortices is believed to induce lateral vibration in the valve member 40, causing the valve member to vibrate against the valve member support shaft 19 resulting in a rattling noise. As such, during normal operation, a conventional venturi valve 40 will often radiate a rattling noise at higher flowrates, which can be amplified within the ductwork of the HVAC system.

FIGS. 4-17 illustrate example embodiments of valve members (FIGS. 4-12 and 16-17) that define various reattachment regions sometimes with flow influencing features, and valve throats (FIGS. 13-17) that may include various flow influencing features. The various reattachment regions and/or the plurality of flow influencing features may be configured to modify the airflow through the valve to reduce vortices and thus rattle emanating from the valve.

In FIGS. 4-12 and 16-17, the valve element includes a reattachment region just downstream of the maximum width region of the valve member. The reattachment region is configured so that the flow of air over the maximum width region reattaches to the surface of the valve member, which may significantly reduce the turbulence kinetic energy in the flow field, and therefore eddies formed in the turbulent air flow. This alone may significantly reduce vortex formation and vortex shedding downstream of the maximum width region of the valve member. In some cases, and with the airflow reattached, it is contemplated that the reattachment region may include one or more flow influencing features that modify the reattached airflow, such as straighten or partially laminarize the reattached airflow along the reattachment region. This may further reduce vortex formation and vortex shedding downstream of the maximum width region of the valve member, thereby further reducing rattle emanating from the valve. In some cases, the reattached air flow may be allowed to separate from the valve member within a separation region that is downstream of the reattachment region. The separation of the air flow from the valve member in the separation region has a considerably less effect on rattle. In FIGS. 13-17, flow influencing features may be included within the valve throat and/or upstream and/or downstream of the valve throat to reduce vortex formation and vortex shedding downstream of the valve throat.

Figure 4:
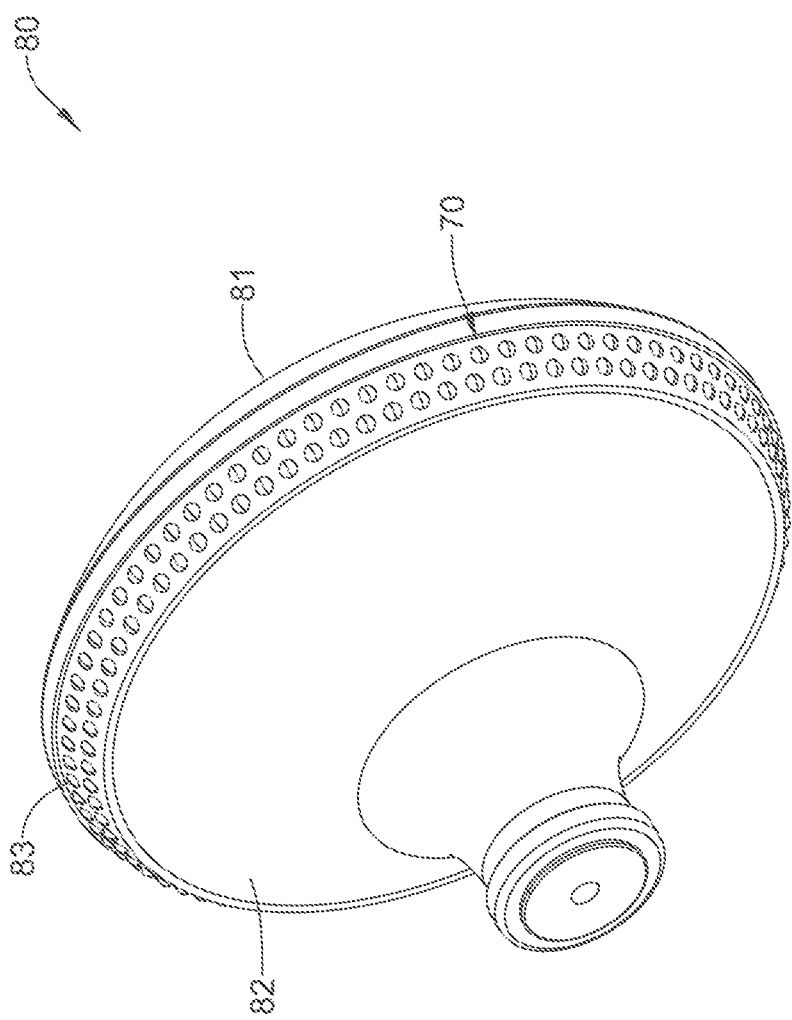
FIG. 4 is a perspective view of an example valve member which may be used in the venturi valve of FIG. 1, the valve member including flow influencing features on a reattachment region of the valve member including a plurality of protrusions.
Figure 5:
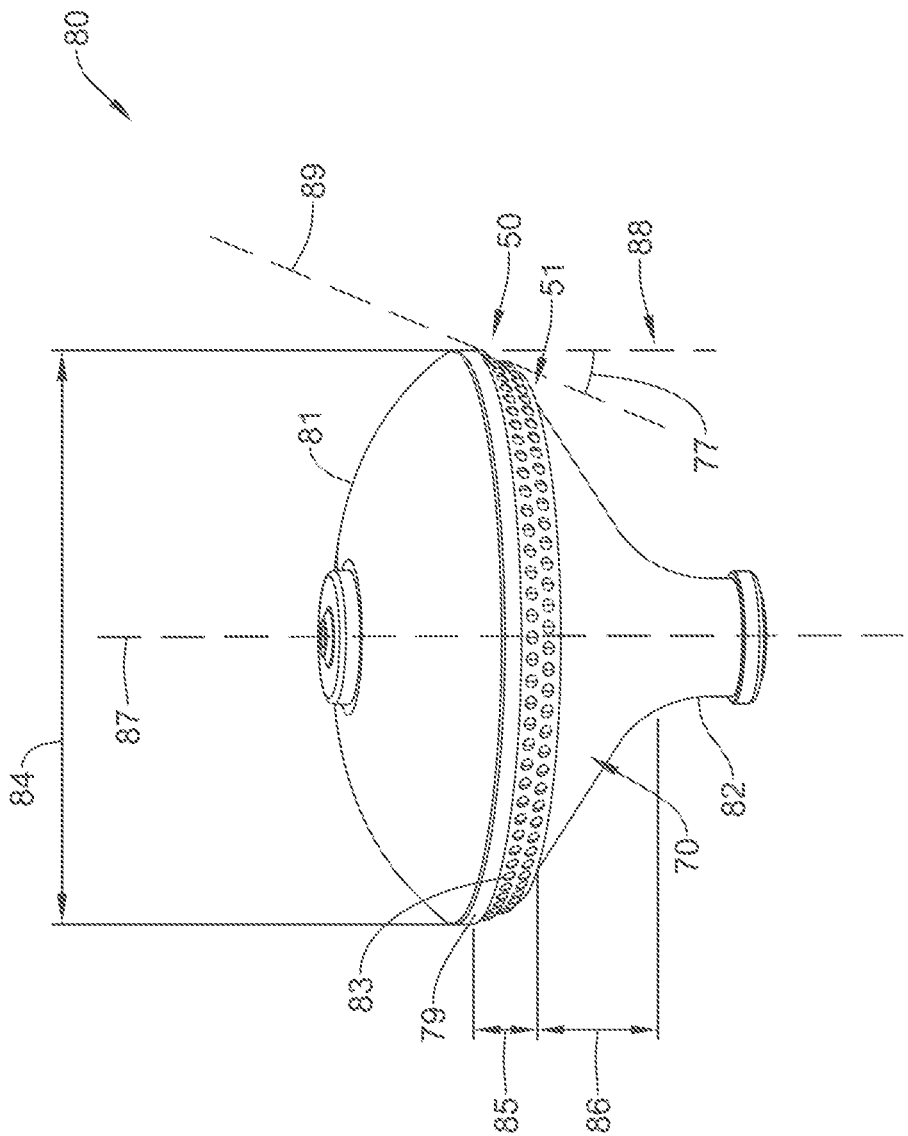
FIG. 5 is a schematic side view of the example valve member of FIG. 4.

FIGS. 4 and 5 illustrate an example embodiment of a valve member 80, which may be used in the example venturi valve 10 of FIG. 1. FIG. 4 is a perspective view of the valve member 80, and FIG. 5 is a schematic side view of the valve member 80. The valve member 80 may include a cone 81 and a funnel 82. The cone 81 is positioned upstream of the funnel 82. The cone 81 may be curved and may include a hemispherical, or dome shape, while the funnel 82 may include a frustoconical shape. The cone 81 and the funnel 82 may be configured such that when the valve member 80 is assembled, a larger end of the funnel 82 may fit within an open end of the cone 81, although this is not explicitly shown.

As shown in FIG. 4, the valve member 80 may include a plurality of distinct flow influencing features 70, which may include a plurality of protrusions 83. In the example shown, the plurality of protrusions 83 include two rows of hemispherical protrusions 83, which are spaced from one another and staggered on a reattachment region (shown in FIG. 5) of the valve member 80. While the valve member 80 is shown as including two rows of the plurality of protrusions 83, it is contemplated that the valve member 80 may include one row of the plurality of protrusions 83, three rows of the plurality of protrusions 83, four rows of the plurality of protrusions 83, or any other suitable number of rows, as desired. In some cases, each row of the plurality of protrusions 83 may include eighty protrusions 83. In some cases, each row of the plurality of protrusions 83 may include twenty protrusions, forty protrusions, fifty protrusions, one hundred protrusions, or any other suitable number of protrusions. While the plurality of protrusions 83 are shown as having a hemispherical shape, it is contemplated that the plurality of protrusions 83 may include a conical shape, a cube shape, a cylindrical shape, a rectangular shape, or any other suitable shape. In some cases, the plurality of protrusions 83 may each include a diameter of 0.25 inches. In some cases, the plurality of protrusions 83 may include a diameter of 0.12 inches, 0.3 inches, 0.5 inches, or any other suitable diameter.

As shown in FIG. 5, the valve member 80 includes a central axis 87, which may extend centrally along a length of the valve member 80, a maximum width region 79, which may define the maximum width 84 of the valve member 80, a reattachment region 85, which may be positioned downstream of the maximum width region 79, and a separation region 86, which may be positioned downstream of the reattachment region 85. The maximum width region 79 may be positioned at a point on the cone 81 where the cone 81 and the funnel 82 meet. The curved, hemispherical shape of the cone 81 may be positioned upstream of the maximum width region 79, and thus may be configured to divert air flow towards the maximum width region 79.

The reattachment region 85 may include an upstream end 50 and a downstream end 51. A first axis 88 may extend out from the upstream end 50 of the reattachment region 85. A second axis 89 may extend from the upstream end 50 of the reattachment region 85 to the downstream end 51 of the reattachment region 85. The first axis 88 is parallel with the central axis 87 of the valve member 80, and the second axis 89 intersects the central axis 87 of the valve member 80 as shown. The first axis 88 and the second axis 89 define an angle 77. The angle 77 may be within a range of five (5) to forty (40) degrees. In some cases, the angle 77 may be between 25 and 35 degrees. These are just examples. The length of the reattachment region 85 may be 0.25 inches to 3 inches, 0.5 inches to 2 inches, 0.5 inches to 1.5 inches, or any other suitable length. The reattachment region 85 may be a straight surface extending from the upstream end 50 to the downstream end 51, or may be curved surface.

In some cases, as shown in FIG. 5, the reattachment region 85 may include the plurality of flow influencing features 70, which may include the plurality of protrusions 83, as discussed with reference to FIG. 4. The reattachment region 85 may be configured to cause air flowing over the maximum width region 79 to reattach to the valve member 80 in the reattachment region 85. Having the airflow reattach in the reattachment region 85 allows the plurality of protrusions 83 to influence the reattached airflow, such as straighten or partially laminarize the reattached airflow along the reattachment region 85. While not required, the air flow that reattaches to the valve member 80 in the reattachment region 85 may be separate from the valve member 80 within a separation region 86.

Figure 6:
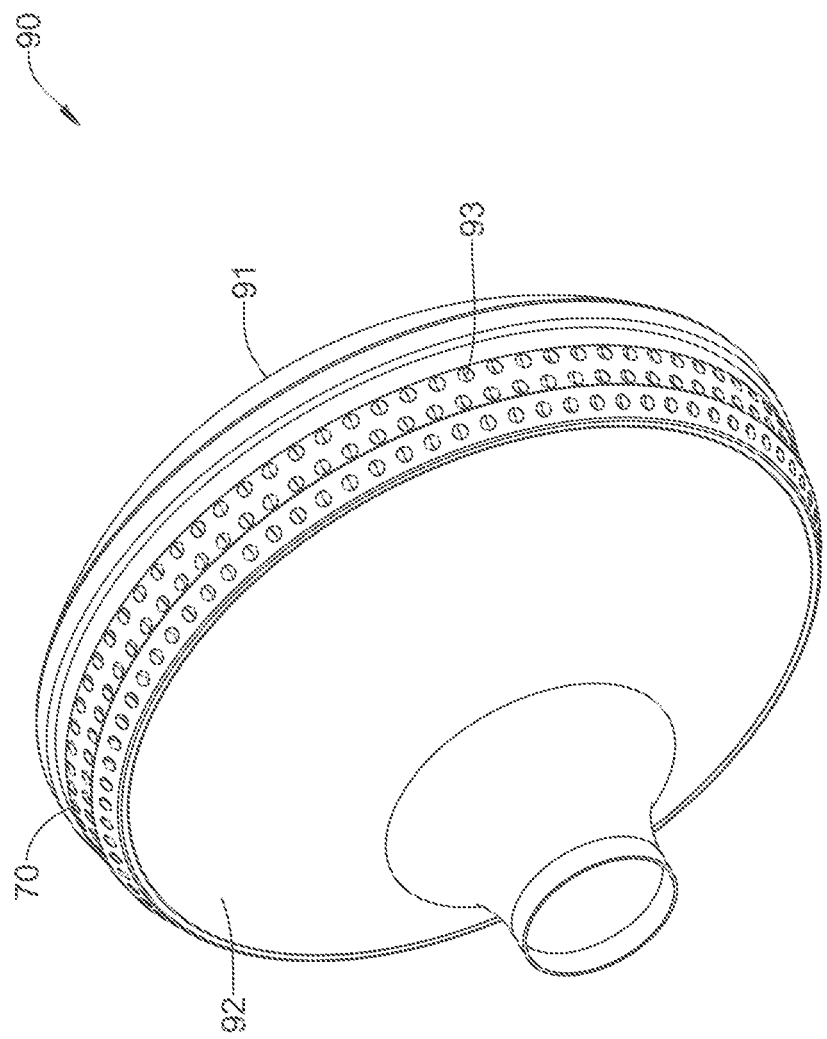
FIG. 6 is a perspective view of an example valve member which may be used in the venturi valve of FIG. 1, the valve member including flow influencing features on a reattachment region of the valve member including a plurality of dimples.
Figure 7:
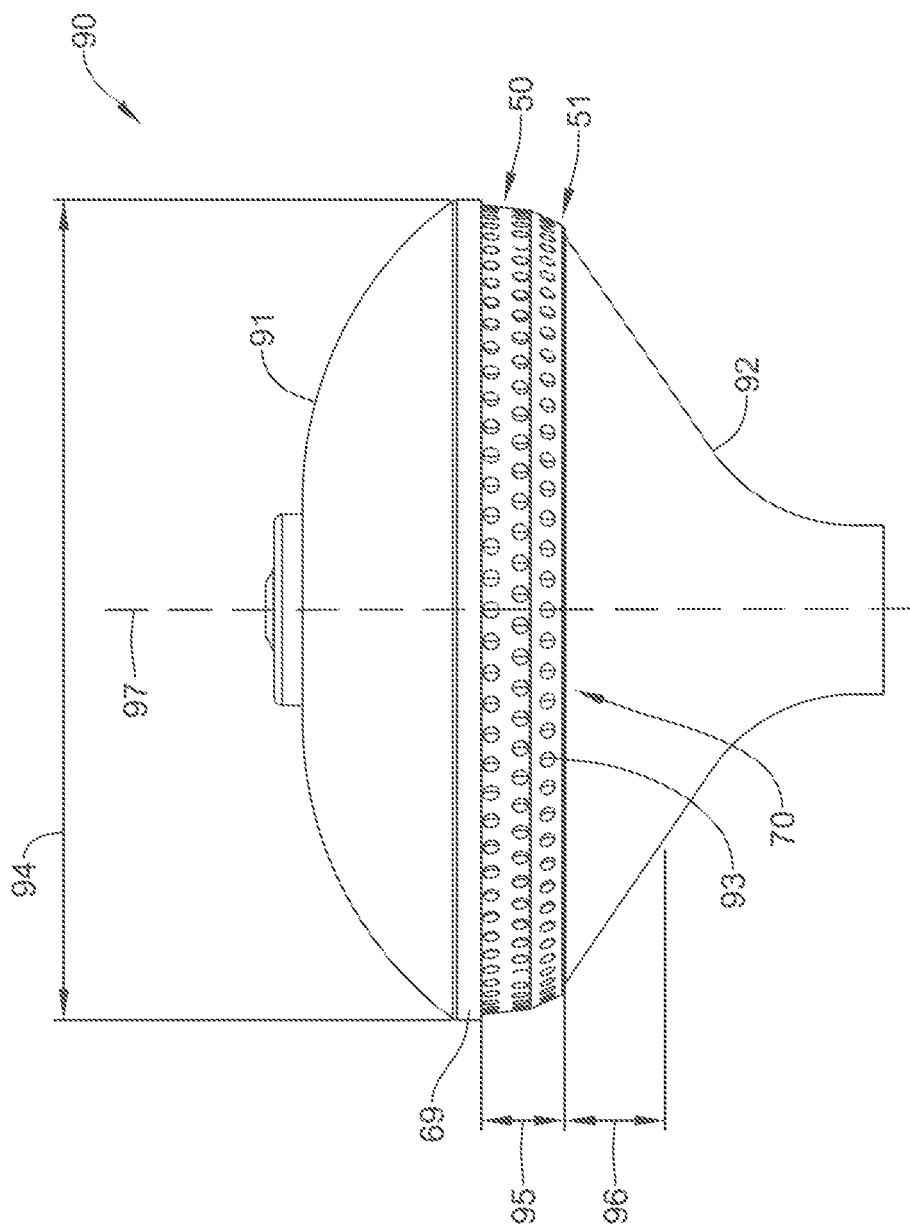
FIG. 7 is a schematic side view of the example valve member of FIG. 6.

FIGS. 6 and 7 illustrate an example embodiment of a valve member 90, which may be used in the example venturi valve 10 of FIG. 1. FIG. 6 is a perspective view of the valve member 90, and FIG. 7 is a schematic side view of the valve member 90. The valve member 90 may include a cone 91 and a funnel 92. The cone 91 is positioned upstream of the funnel 92. The cone 91 may be curved and may include a hemispherical, or dome shape, while the funnel 92 may include a frustoconical shape. The cone 91 and the funnel 92 may be configured such that when the valve member 90 is assembled, a larger end of the funnel 92 may fit within an open end of the cone 91, although this is not explicitly shown.

As shown in FIG. 6, the valve member 90 includes a plurality of distinct flow influencing features 70, which may include a plurality of dimples 93. The plurality of dimples 93 may include three rows of concave, hemispherical dimples 93, which may be spaced from one another and staggered around a reattachment region (shown in FIG. 7) of the valve member 90. While the valve member 90 is shown as including three rows of the plurality of dimples 93, it is contemplated that the valve member 90 may include one row of the plurality of dimples 93, two rows of the plurality of dimples 93, four rows of the plurality of dimples 93, or any other suitable number of rows, as desired. In some cases, each row of the plurality of dimples 93 may include eighty dimples 93. In some cases, each row of the plurality of dimples 93 may include twenty dimples, forty dimples, fifty dimples, one hundred dimples, or any other suitable number of dimples. While the plurality of dimples 93 are shown as having a concave, hemispherical shape, it is contemplated that the plurality of dimples 93 may include a concave conical shape, a concave cube shape, a concave cylindrical shape, a concave rectangular shape, or any other suitable shape. In some cases, the plurality of dimples 93 may each include a diameter of 0.25 inches. In some cases, the plurality of dimples 93 may include a diameter of 0.12 inches, 0.3 inches, 0.5 inches, or any other suitable diameter.

As shown in FIG. 7, the valve member 90 may include a central axis 97, which may extend centrally along a length of the valve member 90, a maximum width region 69, which may define the maximum width 94 of the valve member 90, a reattachment region 95, which may be positioned downstream of the maximum width region 69, and a separation region 96, which may be positioned downstream of the reattachment region 95. The maximum width region 69 may be positioned at a point on the cone 91 where the cone 91 and the funnel 92 meet, but this is not required. The curved, hemispherical shape of the cone 91 may be positioned upstream of the maximum width region 69, and thus may be configured to divert air flow towards the maximum width region 69.

In some cases, as shown in FIG. 7, the reattachment region 95 may include the plurality of flow influencing features 70, which may include the plurality of dimples 93, as discussed with reference to FIG. 6. The reattachment region 95 may be configured to cause air flowing over the maximum width region 69 to reattach to the valve member 90 in the reattachment region 95. Having the airflow reattach in the reattachment region 95 allows the plurality of dimples 93 to influence the reattached airflow, such as straighten or partially laminarize the reattached airflow along the reattachment region 95. While not required, the air flow that reattaches to the valve member 90 in the reattachment region 95 may be configured to separate from the valve member 90 within a separation region 96.

Figure 8:
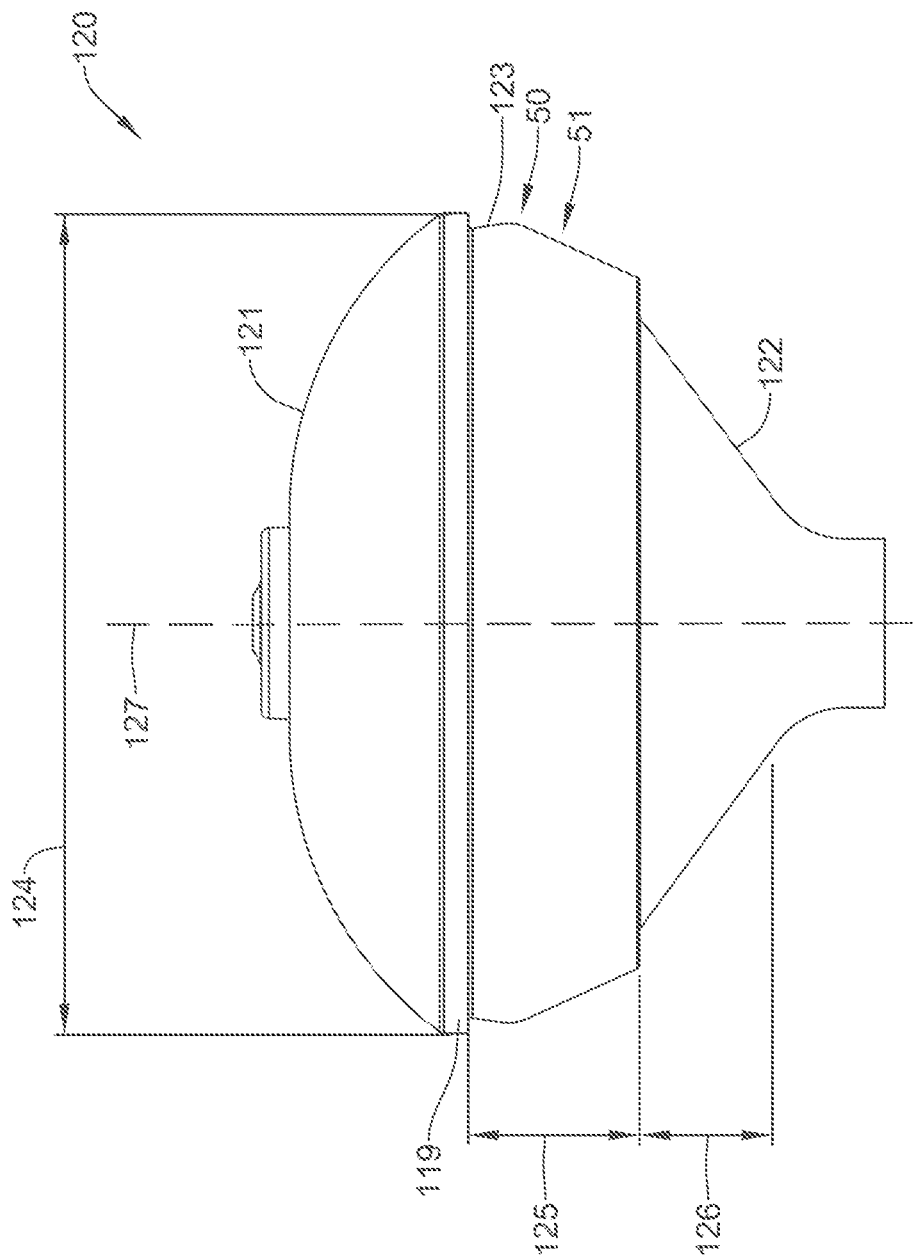
FIG. 8 is a schematic side view of an example valve member which may be used in the venturi valve of FIG. 1, the valve member including an elongated reattachment region.

FIG. 8 illustrates an example embodiment of a valve member 120, which may be used in the example venturi valve 10 of FIG. 1. FIG. 8 is a schematic side view of the valve member 120. The valve member 120 may include a cone 121 and a funnel 122. The cone 121 may be positioned upstream of the funnel 122. The cone 121 may be curved and may include a hemispherical, or dome shape, while the funnel 122 may include a frustoconical shape. The cone 121 and the funnel 122 may be configured such that when the valve member 120 is assembled, a larger end of the funnel 122 may fit within an open end of the cone 121, although this is not explicitly shown. As shown in FIG. 8, the valve member 120 may include a central axis 127, which may extend centrally along a length of the valve member 120, a maximum width region 119, which may define the maximum width 124 of the valve member 120, a reattachment region 125, which may be positioned downstream of the maximum width region 119, and a separation region 126, which may be positioned downstream of the reattachment region 125. The maximum width region 119 may be positioned at a point on the cone 121 where the cone 121 and the funnel 122 meet, although this is not required. The curved, hemispherical shape of the cone 121 may be positioned upstream of the maximum width region 119, and thus may be configured to divert air flow towards the maximum width region 119.

In some cases, as shown in FIG. 8, the cone 121 of the valve member 120 may include a higher aspect ratio as compared to other example embodiments. Further, the reattachment region 125 may include a contour that may be one, two, three or more inches in length from the upstream end 50 of the reattachment region 125 to the downstream end 51 of the reattachment region 125. These lengths are just examples. In the example shown, a notch 123 may be formed just downstream of the maximum width region 119, between the cone 121 and the upstream end 50 of the reattachment region 125 of the valve member 120. The notch 123, which may create a gap where the cone 121 meets the funnel 122. The gap may create a low pressure region that draws the airflow down toward the valve member 120 in the reattachment region 125. The reattachment region 125 may then cause air flowing over the maximum width region 119 to reattach to the valve member 120 in the reattachment region 125. The air flow that reattaches to the valve member 120 in the reattachment region 125 may be configured to separate from the valve member 120 within the separation region 126, but this is not required.

Figure 9:
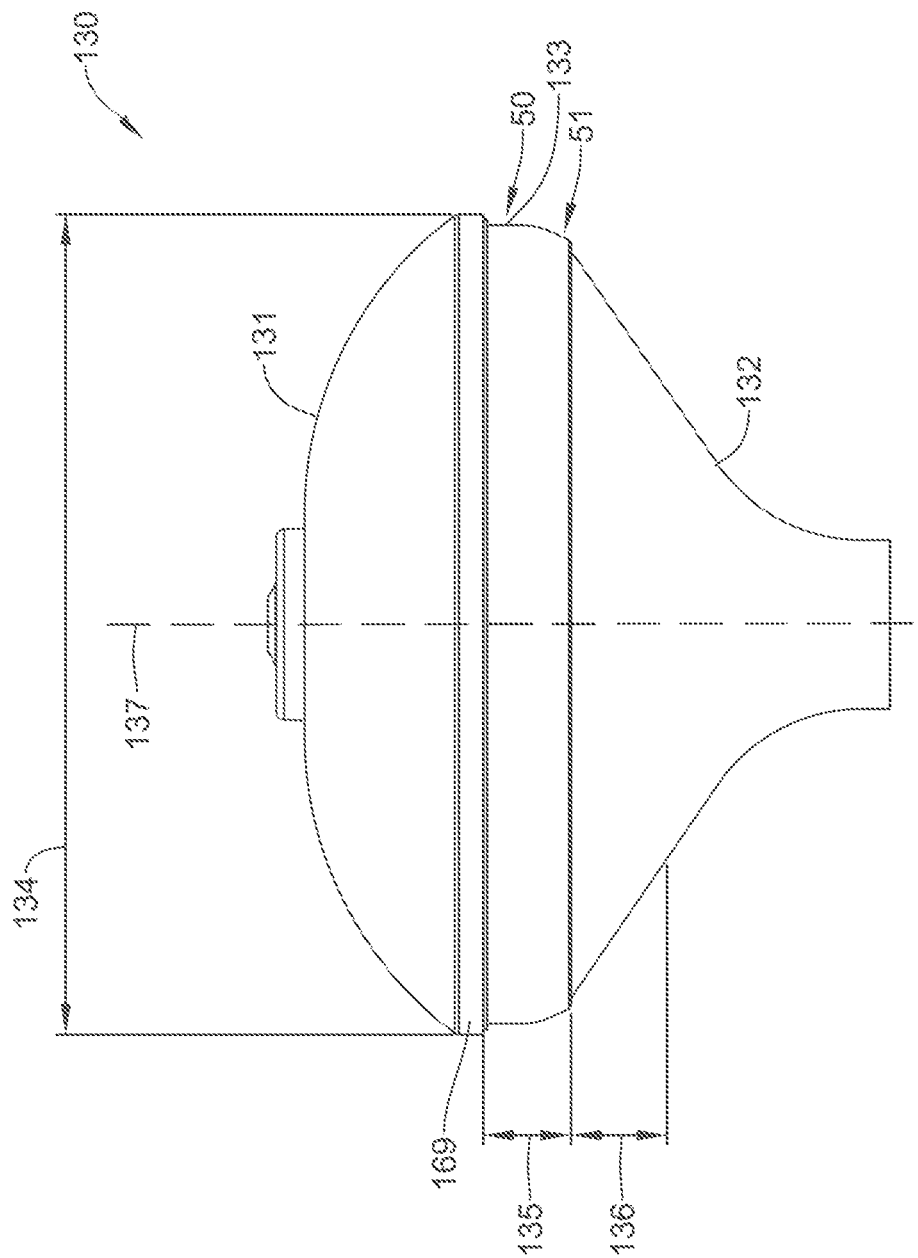
FIG. 9 is a schematic side view of an example valve member which may be used in the venturi valve of FIG. 1, the valve member including an abbreviated reattachment region.

FIG. 9 illustrates an example embodiment of a valve member 130, which may be used in the example venturi valve 10 of FIG. 1. FIG. 9 is a schematic side view of the valve member 130. The valve member 130 may include a cone 131 and a funnel 132. The cone 131 is positioned upstream of the funnel 132. The cone 131 may be curved and may include a hemispherical, or dome shape, while the funnel 132 may include a frustoconical shape, but this is not required. The cone 131 and the funnel 132 may be configured such that when the valve member 130 is assembled, a larger end of the funnel 132 may fit within an open end of the cone 131, although this is not explicitly shown. As shown in FIG. 9, the valve member 130 may include a central axis 137, which may extend centrally along a length of the valve member 130, a maximum width region 169, which may define the maximum width 134 of the valve member 130, a reattachment region 135, which may be positioned downstream of the maximum width region 169, and a separation region 136, which may be positioned downstream of the reattachment region 135. The maximum width region 169 may be positioned at a point on the cone 131 where the cone 131 and the funnel 132 meet, but this is not required. The curved, hemispherical shape of the cone 131 may be positioned upstream of the maximum width region 169, and thus may be configured to divert air flow towards the maximum width region 169.

In some cases, as shown in FIG. 9, the cone 131 of the valve member 130 may include a higher aspect ratio as compared to other example embodiments. Further, the reattachment region 135 may include a contour that may be one, two, three or more inches in length from the upstream end 50 of the reattachment region 135 to the downstream end 51 of the reattachment region 135. These lengths are just examples. A step 133 may be formed just downstream of the maximum width region 169, between the cone 131 and the reattachment region 135 of the valve member 130. In some cases, the step 133 may include a chamfer for a gradual transition from the maximum width region 169 to the reattachment region 135. The reattachment region 135 may then cause air flowing over the maximum width region 169 to reattach to the valve member 130 in the reattachment region 135. The airflow that reattaches to the valve member 130 in the reattachment region 135 may be configured to separate from the valve member 130 within the separation region 136, but this is not required.

Figure 10:
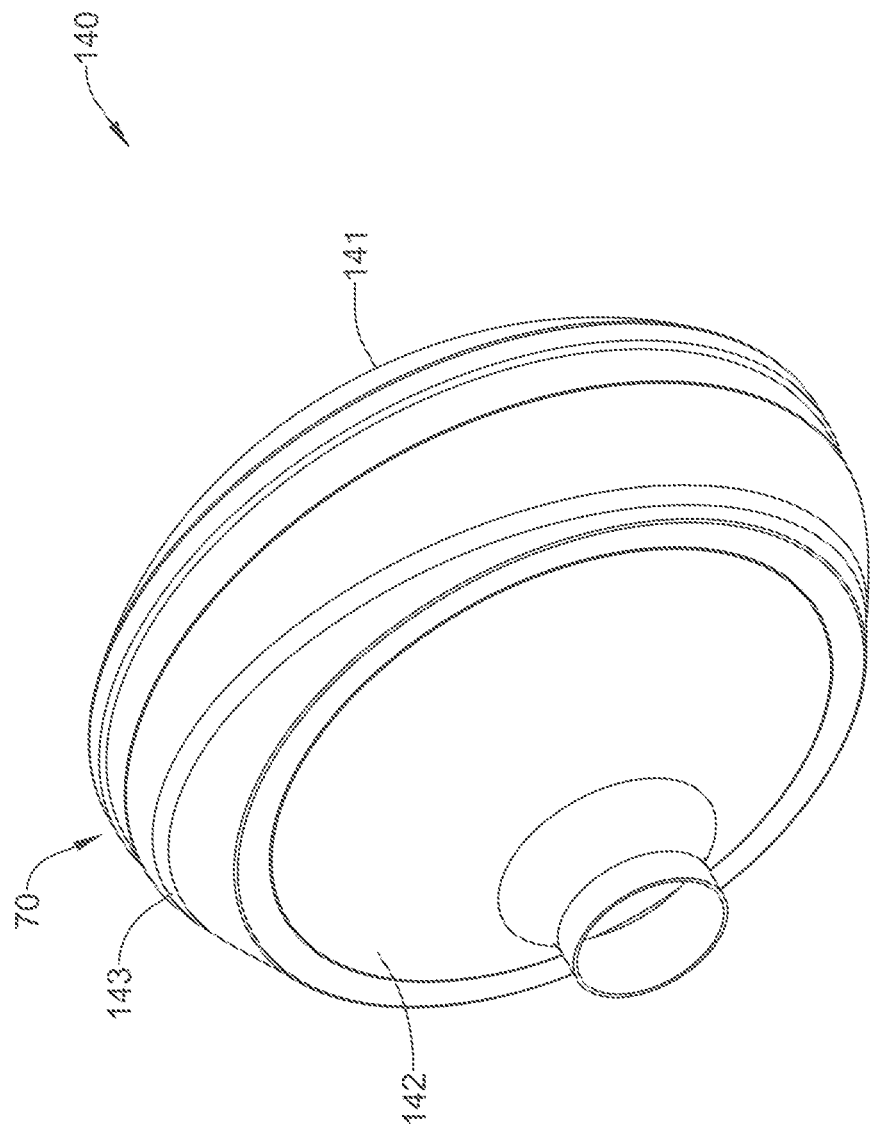
FIG. 10 is a perspective view of an example valve member which may be used in the venturi valve of FIG. 1, the valve member including a groove in a reattachment region of the valve member.
Figure 11:
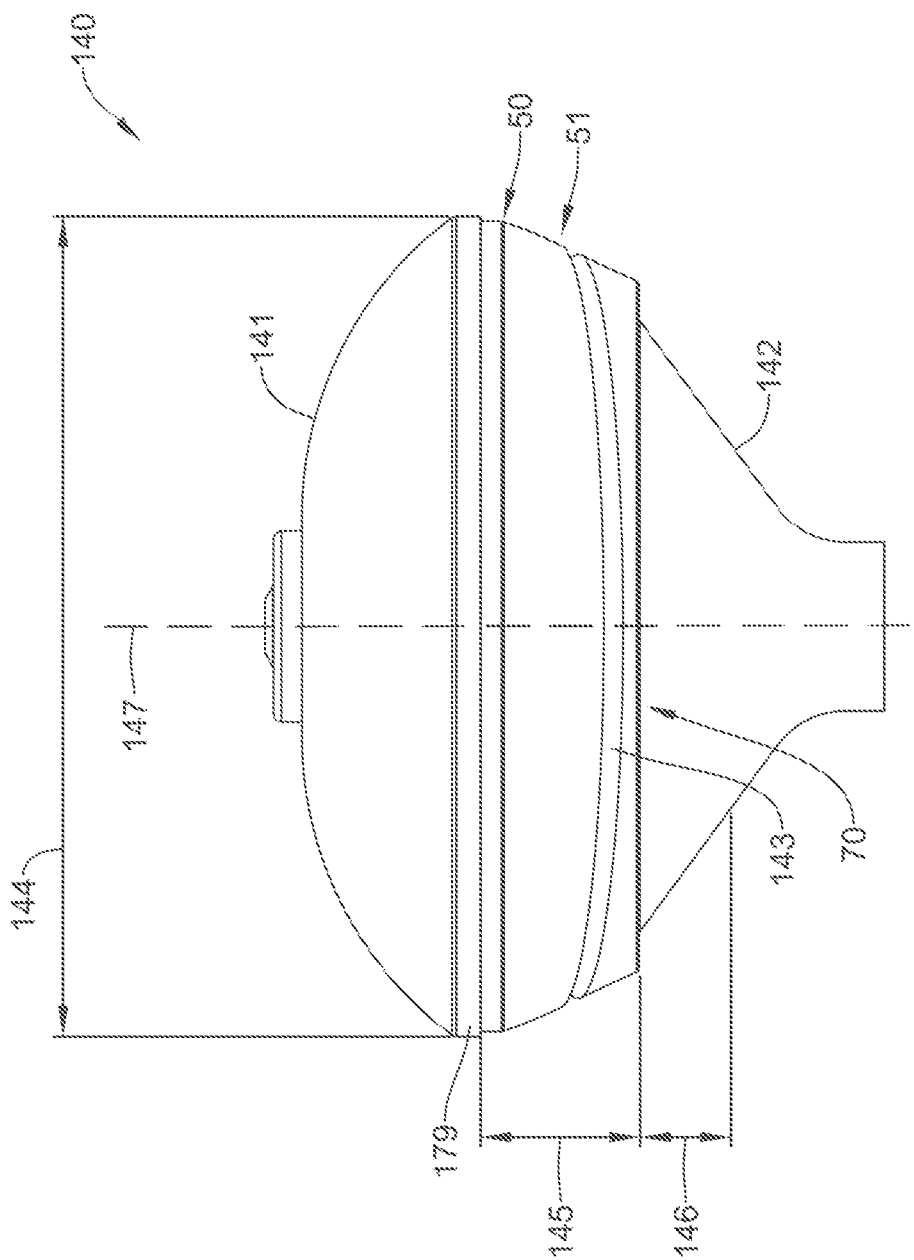
FIG. 11 is a schematic side view of the example valve member of FIG. 10.

FIGS. 10 and 11 illustrate an example embodiment of a valve member 140, which may be used in the example venturi valve 10 of FIG. 1. FIG. 10 is a perspective view of the valve member 140, and FIG. 11 is a schematic side view of the valve member 140. The valve member 140 may include a cone 141 and a funnel 142. The cone 141 is positioned upstream of the funnel 142. The cone 141 may be curved and may include a hemispherical, or dome shape, while the funnel 142 may include a frustoconical shape. The cone 141 and the funnel 142 may be configured such that when the valve member 140 is assembled, a larger end of the funnel 142 may fit within an open end of the cone 141, although this is not explicitly shown. As shown in FIG. 10, the valve member 140 may include one or more distinct flow influencing features 70, which may include one or more grooves 143. The one or more grooves 143 may include a helical groove around a reattachment region (shown in FIG. 11) of the valve member 140.

As shown in FIG. 11, the valve member 140 may include a central axis 147, which may extend centrally along a length of the valve member 140, a maximum width region 179, which may define the maximum width 144 of the valve member 140, a reattachment region 145, which may be positioned downstream of the maximum width region 179, and a separation region 146, which may be positioned downstream of the reattachment region 145. The maximum width region 179 may be positioned at a point on the cone 141 where the cone 141 and the funnel 142 meet, although this is not required. The curved, hemispherical shape of the cone 141 may be positioned upstream of the maximum width region 179, and thus may be configured to divert air flow towards the maximum width region 179.

In some cases, as shown in FIG. 11, the reattachment region 145 may include the one or more grooves 143, as discussed with reference to FIG. 10. The reattachment region 145 may be configured to cause air flowing over the maximum width region 179 to reattach to the valve member 140 in the reattachment region 145. In some cases, the airflow that reattaches to the valve member 140 in the reattachment region 145 may be configured to separate from the valve member 140 within the separation region 146.

Figure 12:
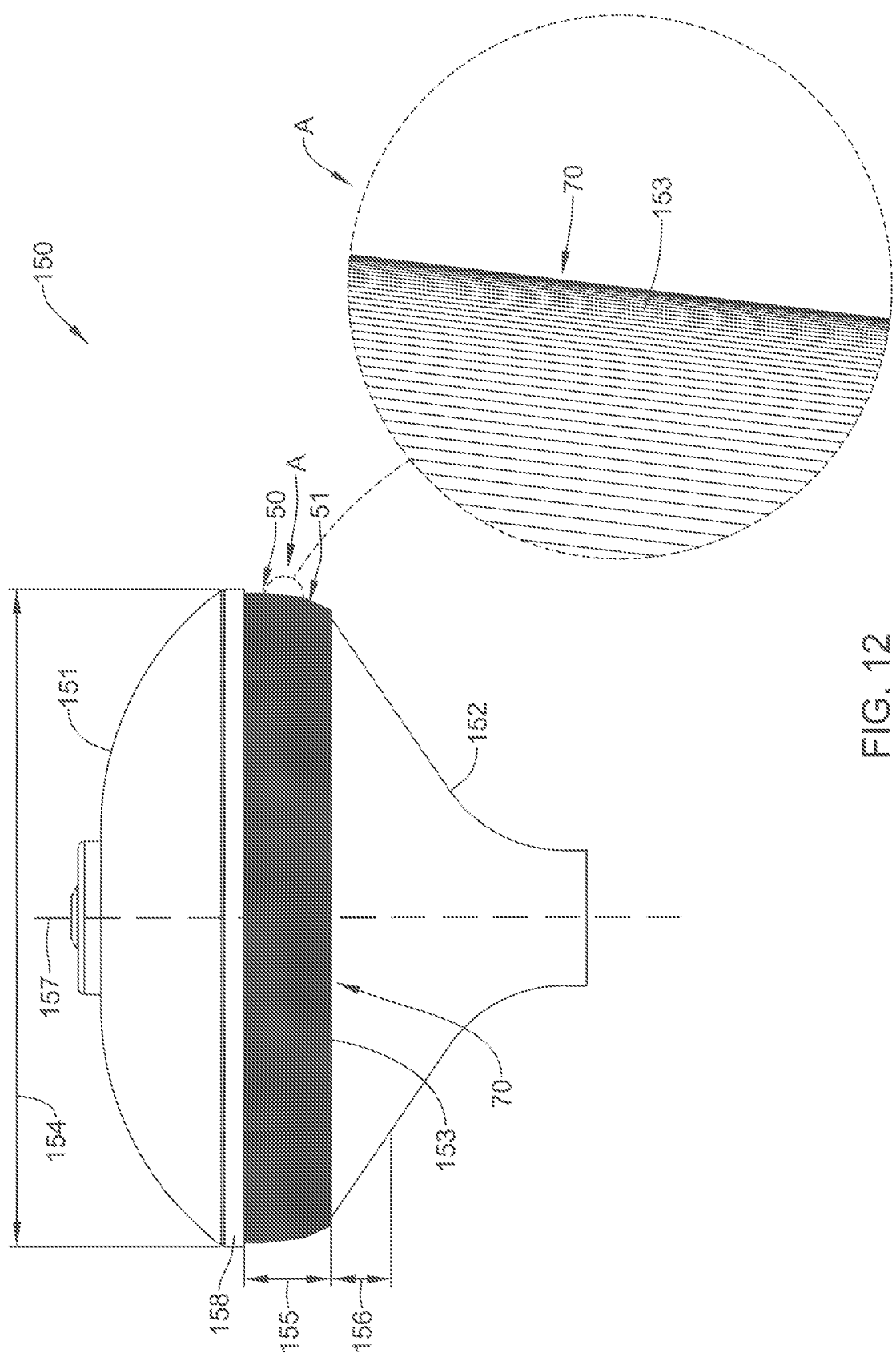
FIG. 12 is a schematic side view of an example valve member which may be used in the venturi valve of FIG. 1, the valve member including flow influencing features in a reattachment region of the valve member including a plurality of riblets.

FIG. 12 illustrates an example embodiment of a valve member 150, which may be used in the example venturi valve 10 of FIG. 1. FIG. 12 is a schematic side view of the valve member 150. The valve member 150 may include a cone 151 and a funnel 152. The cone 151 is positioned upstream of the funnel 152. The cone 151 may be curved and may include a hemispherical, or dome shape, while the funnel 152 may include a frustoconical shape. The cone 151 and the funnel 152 may be configured such that when the valve member 150 is assembled, a larger end of the funnel 152 may fit within an open end of the cone 151, although this is not explicitly shown.

As shown in FIG. 12, the valve member 150 may include a plurality of distinct flow influencing features 70, which may include a plurality of riblets 153. The plurality of riblets 153 may include shallow linear grooves aligned with the air flow stream, as shown in more detail in Circle A. The plurality of riblets 153 may include a depth of 0.01 inches, and may include at least 2,000 riblets 153. In some cases, the plurality of riblets 153 may include more than 2,000 riblets, such as, for example, 5,000, 10,000, or less than 2000, or any suitable number. As shown in FIG. 12, the valve member 150 may include a central axis 157, which may extend centrally along a length of the valve member 150, a maximum width region 158, which may define the maximum width 154 of the valve member 150, a reattachment region 155, which may be positioned downstream of the maximum width region 1548 and a separation region 156, which may be positioned downstream of the reattachment region 155. The maximum width region 158 may be positioned at a point on the cone 151 where the cone 151 and the funnel 152 meet, but this is not required. The curved, hemispherical shape of the cone 151 may be positioned upstream of the maximum width region 158, and thus may be configured to divert air flow towards the maximum width region 158.

In some cases, as shown in FIG. 12, the reattachment region 155 may include the plurality of riblets 153. The reattachment region 155 may be configured to cause air flowing over the maximum width region 158 to reattach to the valve member 150 in the reattachment region 155. In some cases, the airflow that reattaches to the valve member 150 in the reattachment region 155 may be configured to separate from the valve member 150 within the separation region 156.

Figure 13:
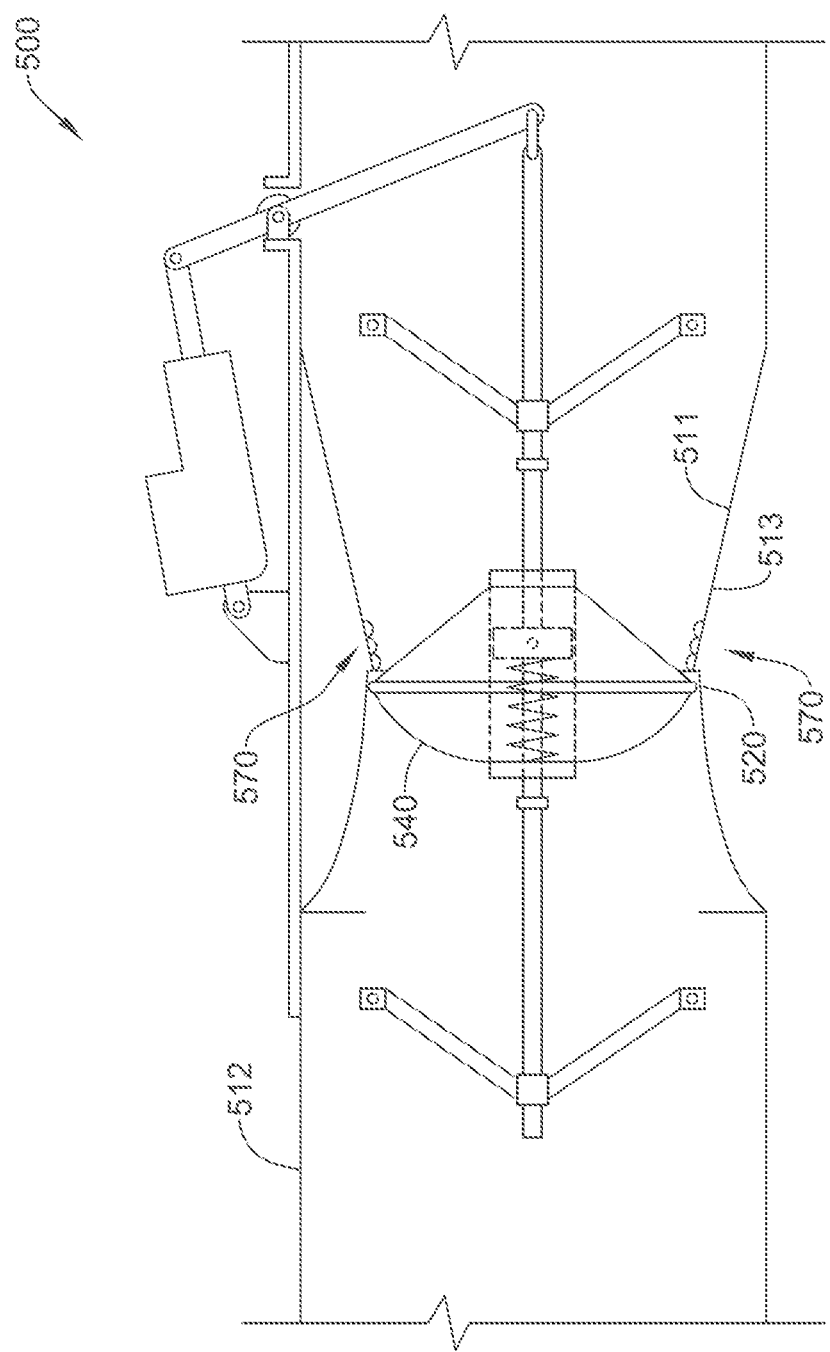
FIG. 13 is a schematic side view of an example venturi valve, wherein a valve throat of the venturi valve includes a plurality flow influencing features.

FIG. 13 is a schematic side view of an example venturi valve 500, wherein a valve throat 520 of the venturi valve 500 includes a plurality flow influencing features 570. The venturi valve 500 may be an example of the venturi valve 10, as discussed with reference to FIGS. 1-3, but this is not required. The venturi valve 500 may include a housing 512 having an inner wall 511 that defines the valve throat 520, and a valve member 540. The valve member 540 may be an example of the valve member 40, as discussed with reference to FIGS. 1-3, or may be one of the valve members described in FIGS. 4-12. As shown in FIG. 13, the venturi valve 500 may include a plurality of distinct flow influencing features 570 which may extend inward from the inner wall 511 of the valve housing 512 at or adjacent to the valve throat 520. In some cases, the plurality of distinct flow influencing features 570 may extend inward from the inner wall 511 of the valve housing 512 upstream and/or downstream of the valve throat 520. In some cases, the plurality of flow influencing features 570 may extend inward from the inner wall 511 of the valve housing 512 at or adjacent a broadening section 513 of the valve housing 512. The plurality of flow influencing features 570 may be configured to reduce perturbations in an air flow passing along the inner wall 511 of the valve housing 512 in a manner similar to that previously discussed.

Figure 14:
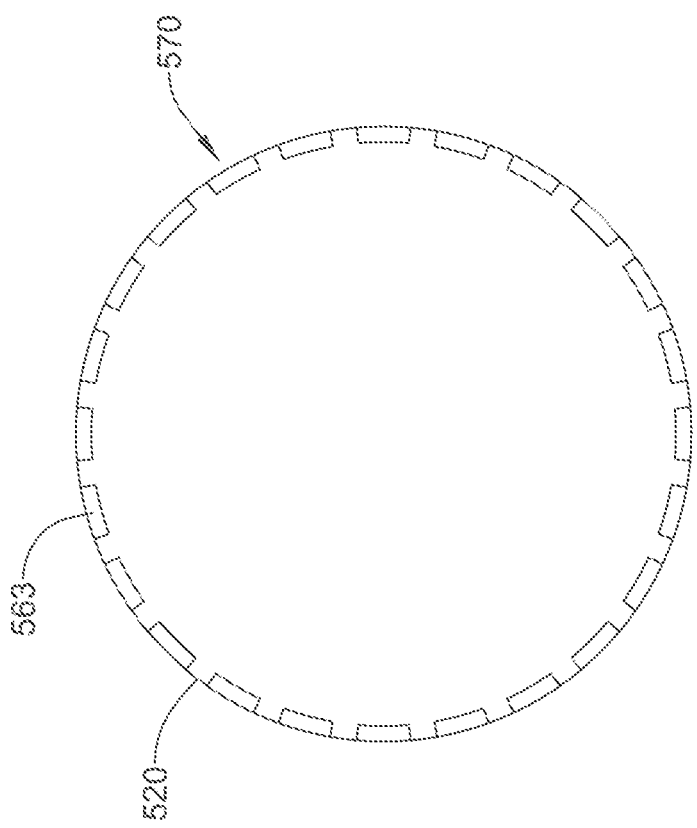
FIG. 14 is a schematic end view showing the valve throat of the venturi valve of FIG. 13, the valve throat including flow influencing features.

FIG. 14 is a schematic end view showing the valve throat 520 of the venturi valve 500 of FIG. 13. As can be seen, the valve throat 520 may include the plurality of flow influencing features 570, which may include a plurality of protrusions 563. The plurality of protrusions 563 may include a plurality of rectangular tabs that extend inward from the inner wall 511 of the valve housing 512 (as shown in FIG. 13). The plurality of protrusions 563 may extend out from the inner wall by 3/16 inches, however this is merely an example, and the plurality of protrusions 563 may extend out any suitable distance. In some examples, the plurality of protrusions 563 may include twenty rectangular tabs distributed around the valve throat 520. In other examples, as shown in FIG. 14, the plurality of protrusions 563 may include twenty-four rectangular tabs. In some cases, the plurality of protrusions 563 may include ten rectangular tabs, thirty rectangular tabs, forty rectangular tabs, or any other suitable number of rectangular tabs. While the plurality of protrusions 563 is illustrated as having a rectangular shape, it is contemplated that the plurality of protrusions 563 may include a conical shape, a cube shape, a cylindrical shape, a hemispherical shape, or any other suitable shape.

Figure 15:
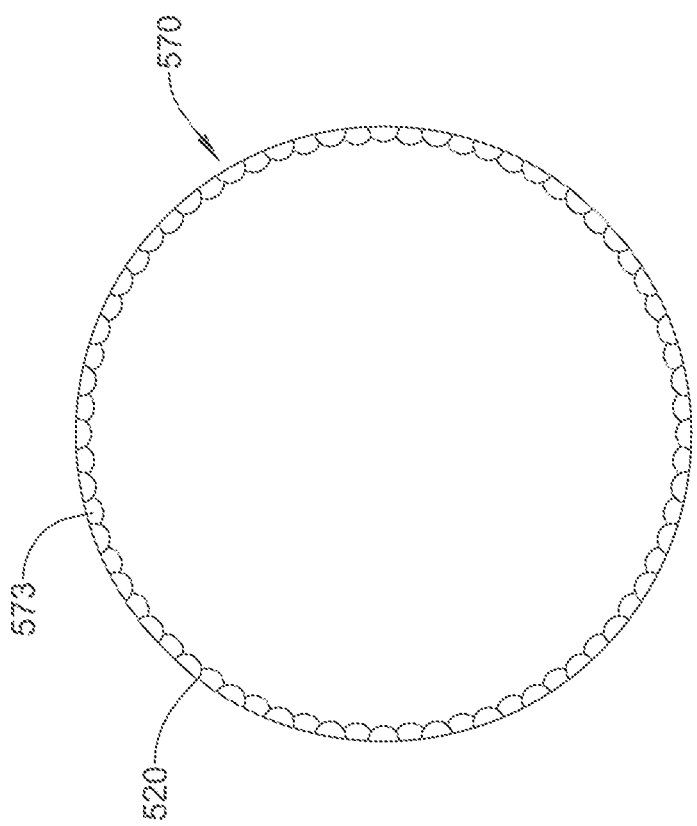
FIG. 15 is a schematic end view showing the valve throat of the venturi valve of FIG. 13, the valve throat including flow influencing features.

FIG. 15 is a schematic end view showing the valve throat 520 of the venturi valve 500 of FIG. 13. As can be seen, the valve throat 520 may include the plurality of flow influencing features 570, which may include a plurality of protrusions 573. The plurality of protrusions 573 may extend inward from the inner wall 511 of the valve housing 512. The plurality of protrusions 573 may include two rows of hemispherical protrusions 573, which may be spaced from one another and staggered at or adjacent to the valve throat 520 of the valve housing 512. While the valve throat 520 is shown as including two rows of the plurality of protrusions 573, it is contemplated that the valve throat 520 may include one row of the plurality of protrusions 573, three rows of the plurality of protrusions 573, four rows of the plurality of protrusions 573, or any other suitable number of rows, as desired. In some cases, each row of the plurality of protrusions 573 may include eighty protrusions 573. In some cases, each row of the plurality of protrusions 573 may include twenty protrusions, forty protrusions, fifty protrusions, one hundred protrusions, or any other suitable number of protrusions. While the plurality of protrusions 573 are shown as having a hemispherical shape, it is contemplated that the plurality of protrusions 573 may include a conical shape, a cube shape, a cylindrical shape, a rectangular shape, or any other suitable shape.

Figure 16:
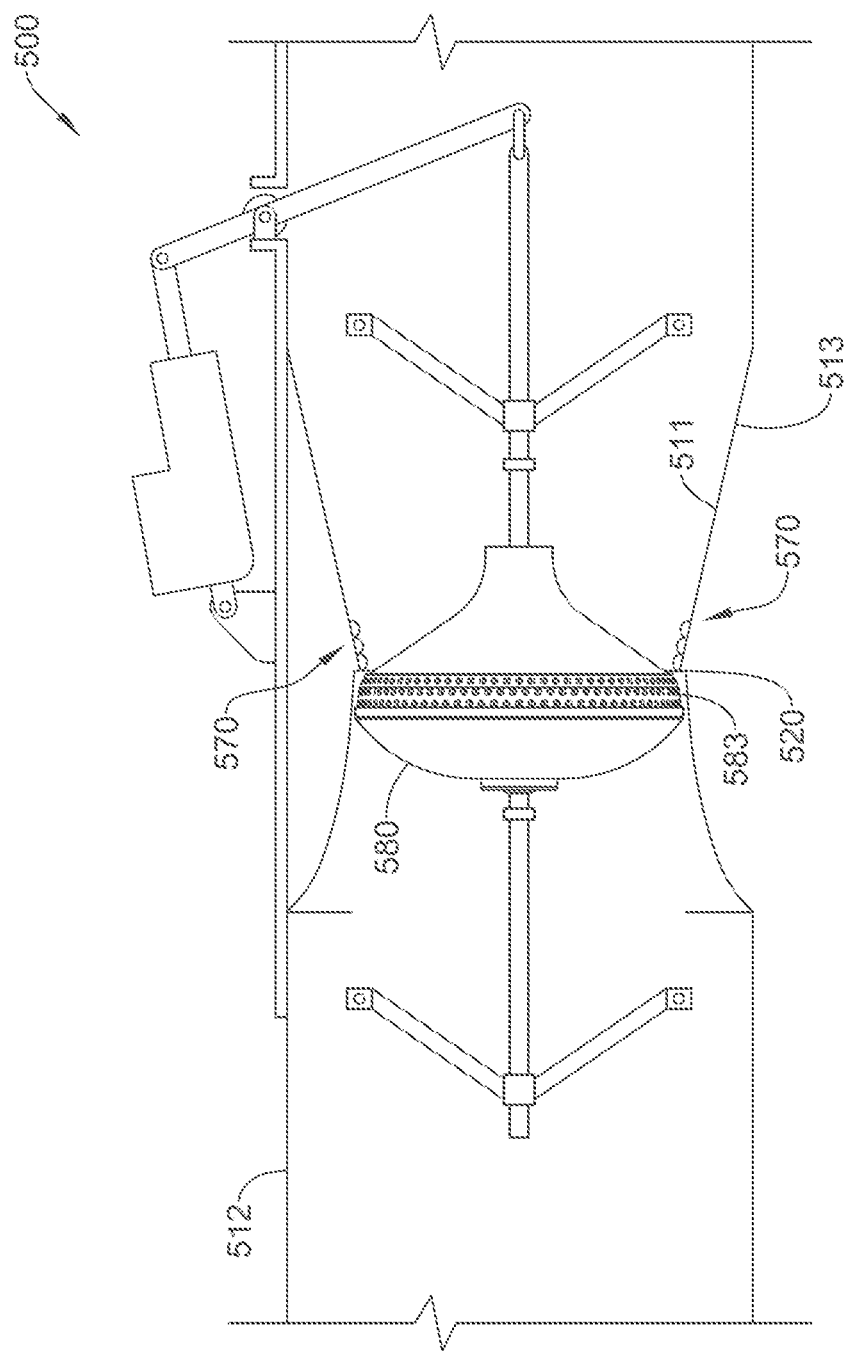
FIG. 16 is a schematic side view of an example venturi valve, wherein a valve throat of the venturi valve includes flow influencing features and a valve member includes flow influencing features on a reattachment region of the valve member.
Figure 17:
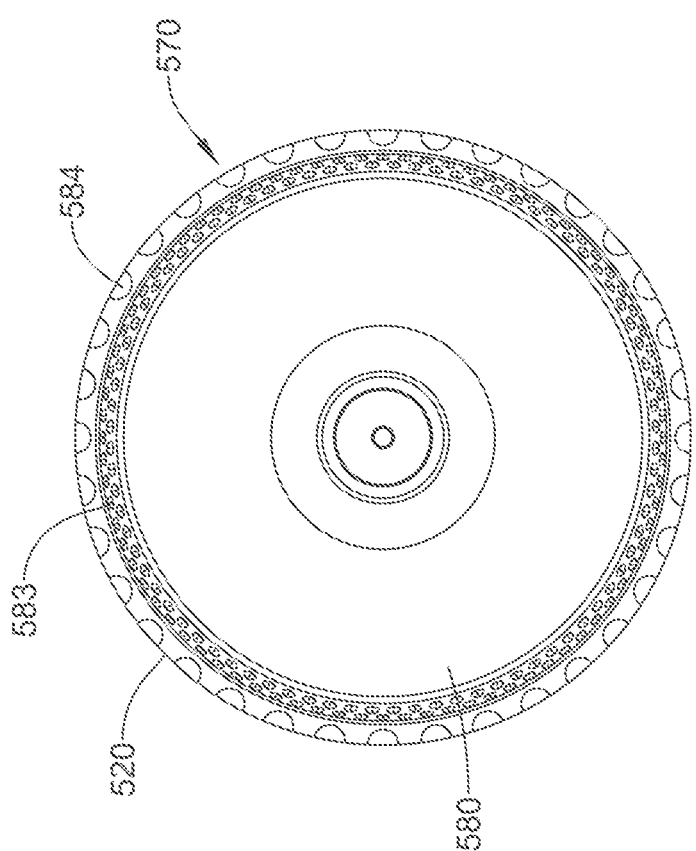
FIG. 17 is a schematic end view showing the valve throat of the venturi valve of FIG. 16, the valve throat including flow influencing features and the valve member includes flow influencing features on a reattachment region of the valve member.

FIGS. 16 and 17 illustrate an example embodiment of the venturi valve 500 including a valve member 580. FIG. 16 is a schematic side view of the venturi valve 500, wherein the valve throat 520 of the venturi valve 500 includes flow influencing features 570, which may include a plurality of protrusions 584 (shown in FIG. 17), and a valve member 580 includes flow influencing features 583. FIG. 17 is an end view showing the valve throat 520 of the venturi valve 500 of FIG. 16. The flow influencing features 583 of the valve member 580 may include a plurality of protrusions 583. The plurality of protrusions 583 and 584 may include three rows of hemispherical protrusions 583, 584, which may be spaced from one another and staggered around a reattachment region (not shown) of the valve member 580 and/or the valve throat 520. While the valve member 580 and the valve throat 520 are shown as including three rows of the plurality of protrusions 583, 584, it is contemplated that the valve member 580 and the valve throat 520 may include one row of the plurality of protrusions 583, 584, two rows of the plurality of protrusions 583, 584, four rows of the plurality of protrusions 583, 584, or any other suitable number of rows, as desired. In some cases, each row of the plurality of protrusions 583, 584, may include eighty protrusions 583, 584. In some cases, each row of the plurality of protrusions 583, 584 may include twenty protrusions, forty protrusions, fifty protrusions, one hundred protrusions, or any other suitable number of protrusions. While the plurality of protrusions 583, 584 are shown as having a hemispherical shape, it is contemplated that the plurality of protrusions 583, 584 may include a conical shape, a cube shape, a cylindrical shape, a rectangular shape, or any other suitable shape.

FIGS. 18-27 show graphs illustrating points of audible rattling and no rattling at various flow rates and differential pressures of various venturi valves under test including various valve member disclosed herein. The data was collected by listening for rattle of each tested valve member at various flow rates and differential pressures. The flow rates are expressed in cubic feet per minute (CFM) and the differential pressures are expressed in inches of water (WC). The data for each venturi valve under test was then plotted on its respective graph.

Figure 18:
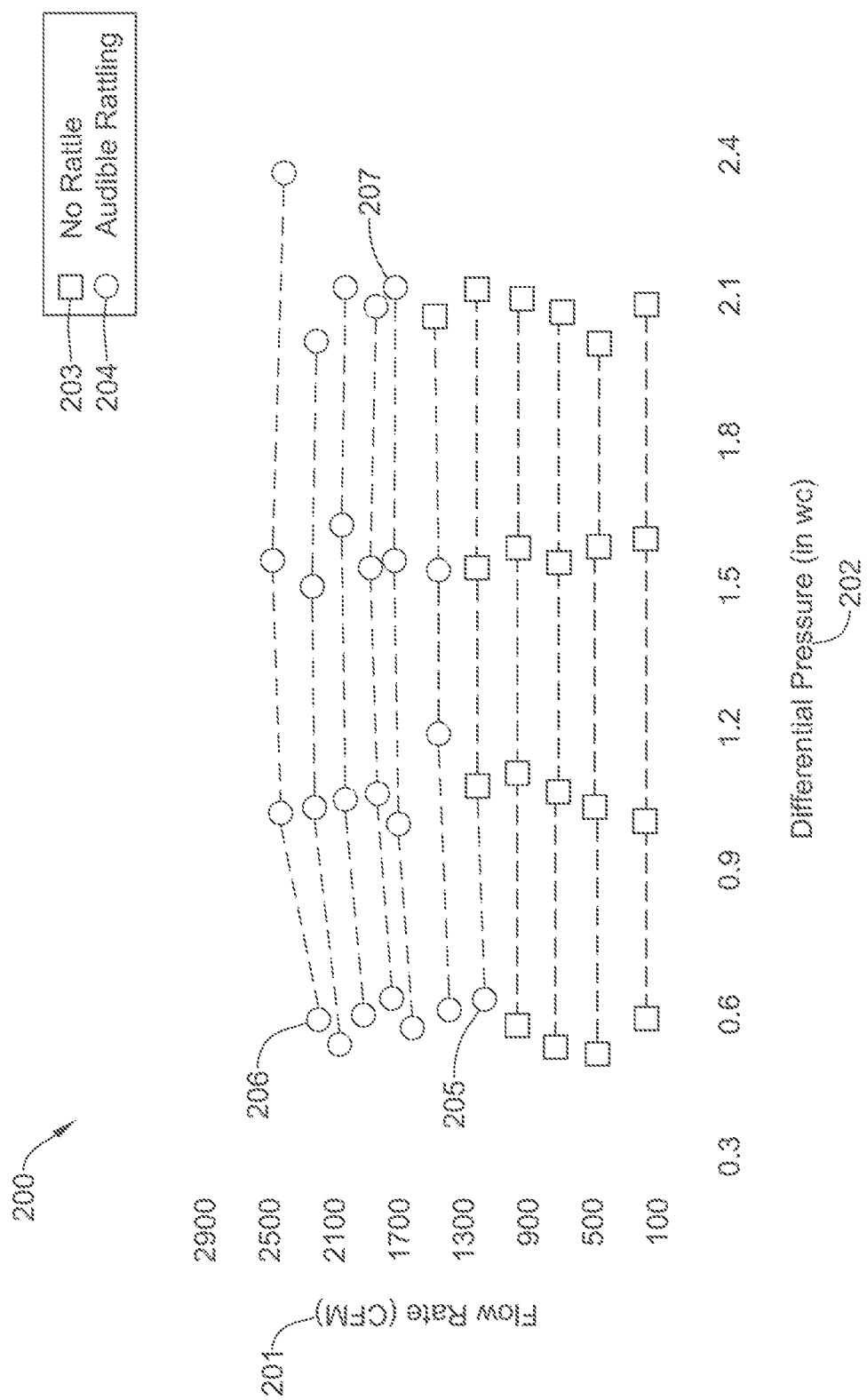
FIG. 18 is a graph illustrating points of audible rattling and no rattling at various flow rates and differential pressure of a valve member as in FIGS. 1-3.

FIG. 18 is a graph 200 illustrating points of audible rattling 204 and no rattling 203 of the valve member 40 as in FIGS. 1-3, where the valve member 40 does not include a reattachment region and/or flow influencing features and the valve housing does not include flow influencing features. That is, the data shown in FIG. 18 is taken on a prior art venturi valve that does not have any of the benefits disclosed by the present disclosure. As shown in graph 200, an audible rattling 204 was first heard around 1200 CFM and 0.6 inch WC, as indicated at point 205. The audible rattling 204 was still heard at a flow rate of around 2100 CFM and 0.6 inch WC, as indicated at point 206. As the differential pressure 202 increased, the audible rattling 204 first occurs at bit higher flow rates 201. For example, when the differential pressure 202 was 2.1 inch WC, the audible rattling 204 began to occur at around 1600 CFM.

Figure 19:
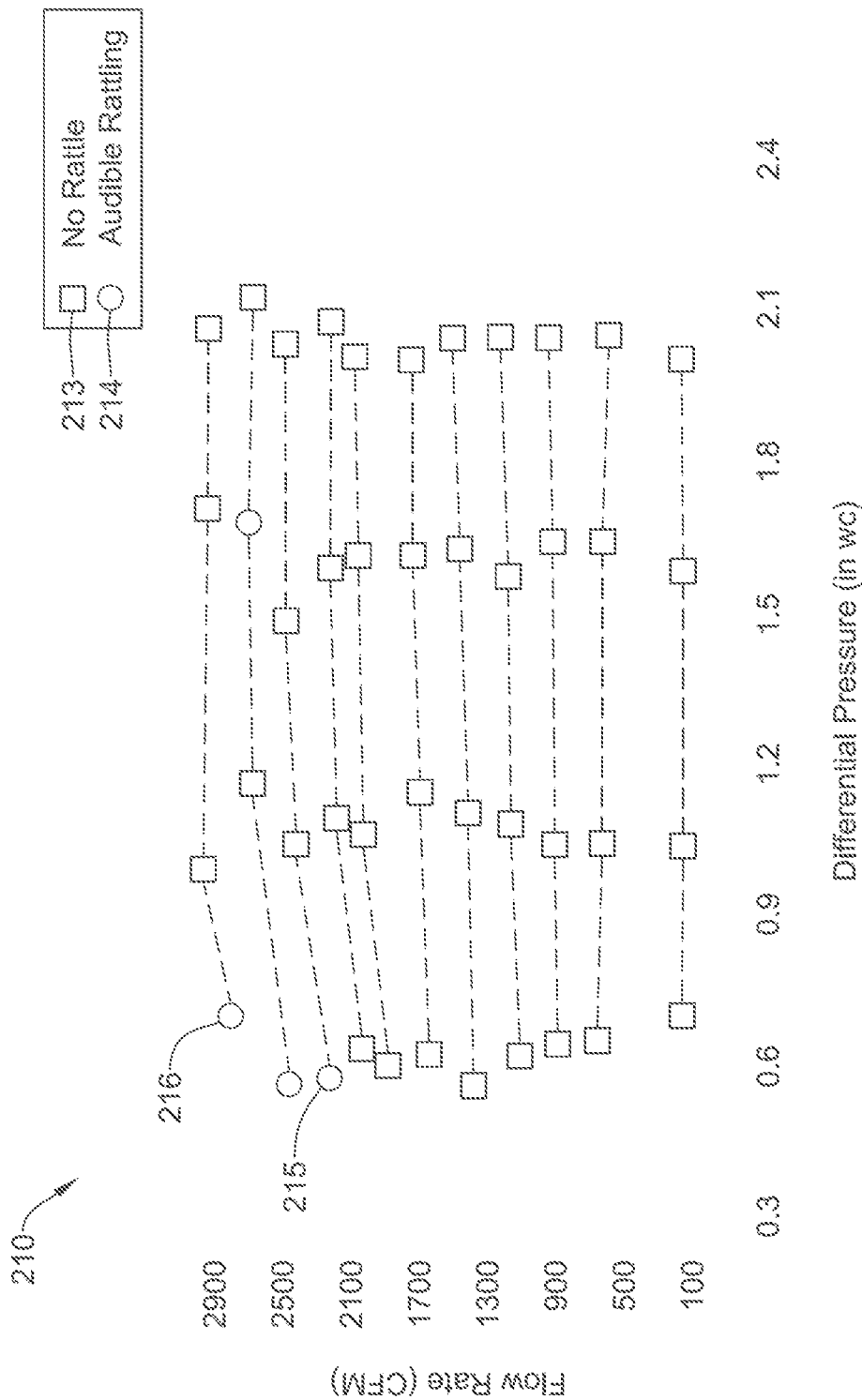
FIG. 19 is a graph illustrating points of audible rattling and no rattling at various flow rates and differential pressure of the valve member as in FIGS. 4-5.

FIG. 19 is a graph 210 illustrating points of audible rattling 214 and no rattling 213 of the valve member 80 of FIGS. 4-5. As shown in FIGS. 4-5, the valve member 80 includes a reattachment region 85 and a plurality of flow influencing features 70. The plurality of flow influencing features 70 of FIGS. 4-5 include a plurality of protrusions 83. In summary, as can be seen in the graph 210, an audible rattling 214 was first heard at a flow rate of around 2100 CFM and a differential pressure of around 0.6 inch WC, as indicated at point 215. As shown, the audible rattling 214 was still heard at a flow rate of around 2700 CFM and a differential pressure of 0.7 inch WC, as indicated at point 216. When the differential pressure was increased to 2.2 inch WC, there was no audible rattling 214 over all tested flow rates. As can be seen, the valve member 80 of FIGS. 4-5 performed significantly better than the prior art venturi valve tested in FIG. 18.

Figure 20:
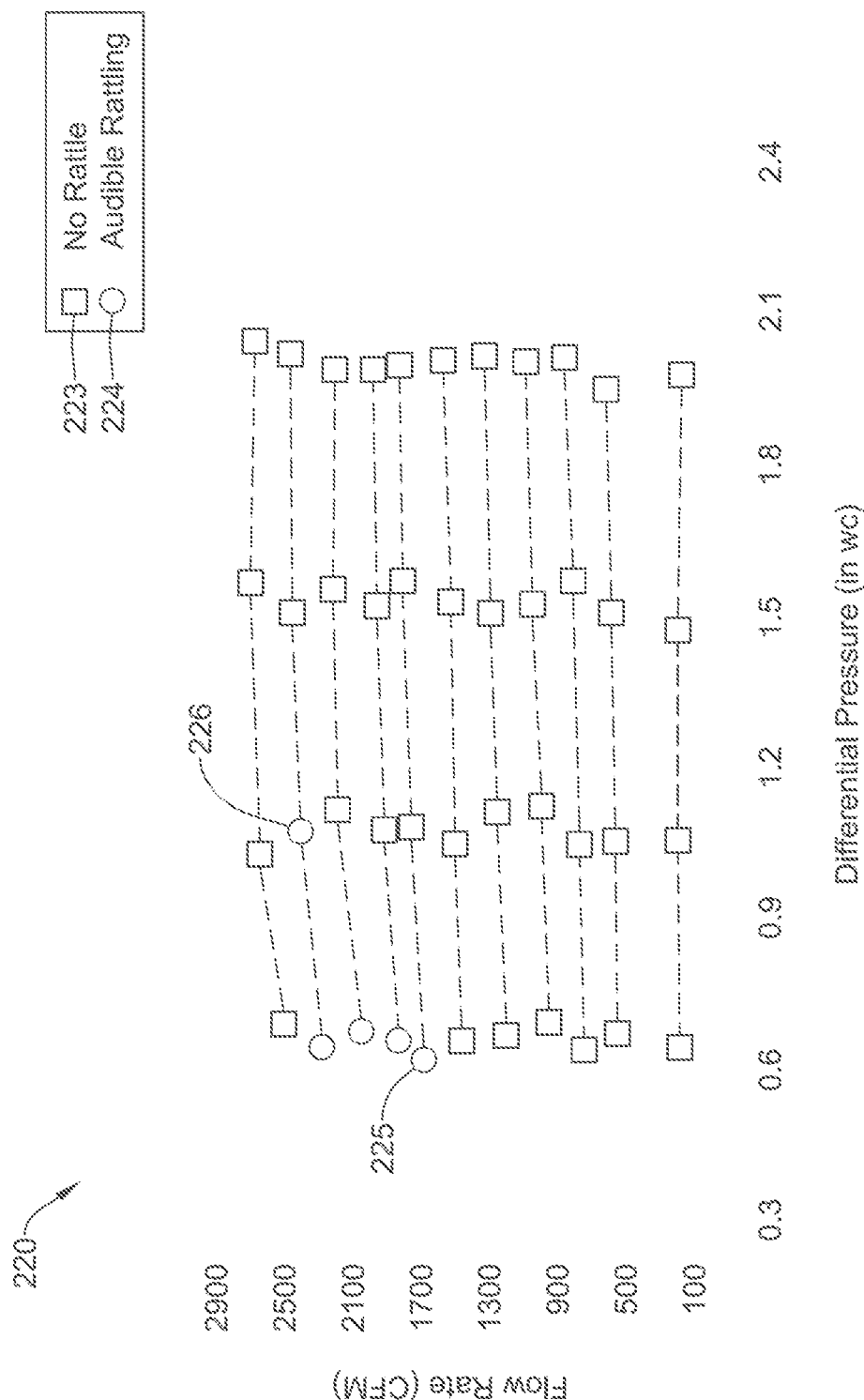
FIG. 20 is a graph illustrating points of audible rattling and no rattling at various flow rates and differential pressure of the valve member as in FIGS. 6-7.

FIG. 20 is a graph 220 illustrating points of audible rattling 224 and no rattling 223 of the valve member 90 of FIGS. 6-7. As shown in FIGS. 6-7, the valve member 90 includes a reattachment region 95 and a plurality of flow influencing features 70. The plurality of flow influencing features 70 of FIGS. 6-7 include a plurality of dimples 93. In summary, and as can be seen in the graph 220, an audible rattling 224 was first heard at a flow rate of around 1650 CFM and a differential pressure of around 0.6 inch WC, as indicated at point 225. The audible rattling 224 was still heard at a flow rate of around 2300 CFM and a differential pressure of 1.0 inch WC, as indicated at point 226. When the differential pressure was increased to 2.1 inch WC, there was no audible rattling 224 over all tested flow rates. As can be seen, the valve member 90 of FIGS. 6-7 performed significantly better than the prior art venturi valve tested in FIG. 18.

Figure 21:
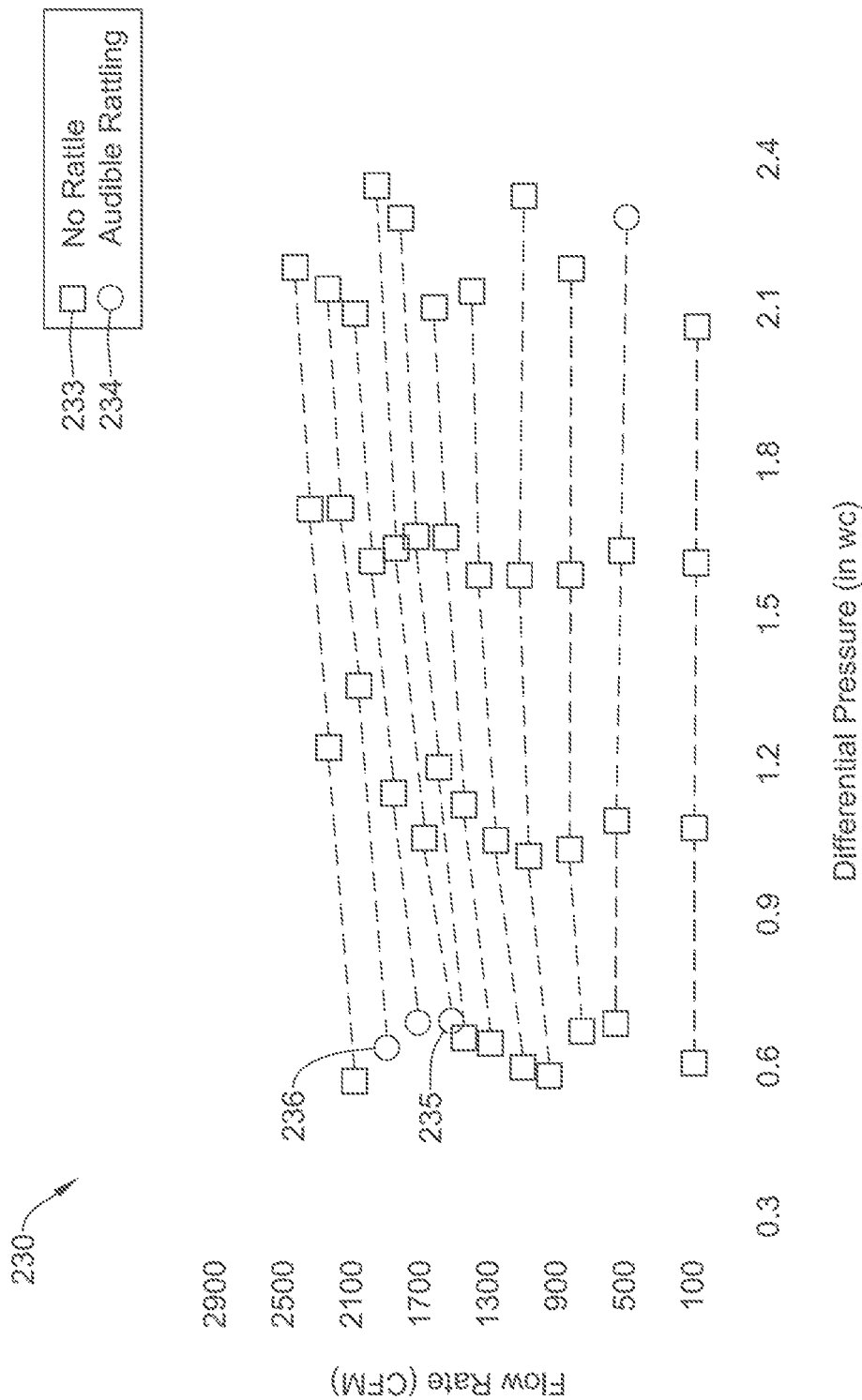
FIG. 21 is a graph illustrating points of audible rattling and no rattling at various flow rates and differential pressure of the valve member as in FIG. 8.

FIG. 21 is a graph 230 illustrating points of audible rattling 234 and no rattling 233 of the valve member 120 of FIG. 8. As shown in FIG. 8, the valve member 120 includes a reattachment region 125. In summary, as can be seen in the graph 230, an audible rattling 234 was first heard at a flow rate of around 1600 CFM and a differential pressure of around 0.7 inch WC, as indicated at point 235. As shown, the audible rattling 234 was still heard at a flow rate of around 1800 CFM and a differential pressure of 0.6 inch WC, as indicated at point 236. When the differential pressure was increased to 2.3 WC, there was no audible rattling 234 across all tested flow rates. As can be seen, the valve member 120 of FIG. 8 performed significantly better than the prior art venturi valve tested in FIG. 18.

Figure 22:
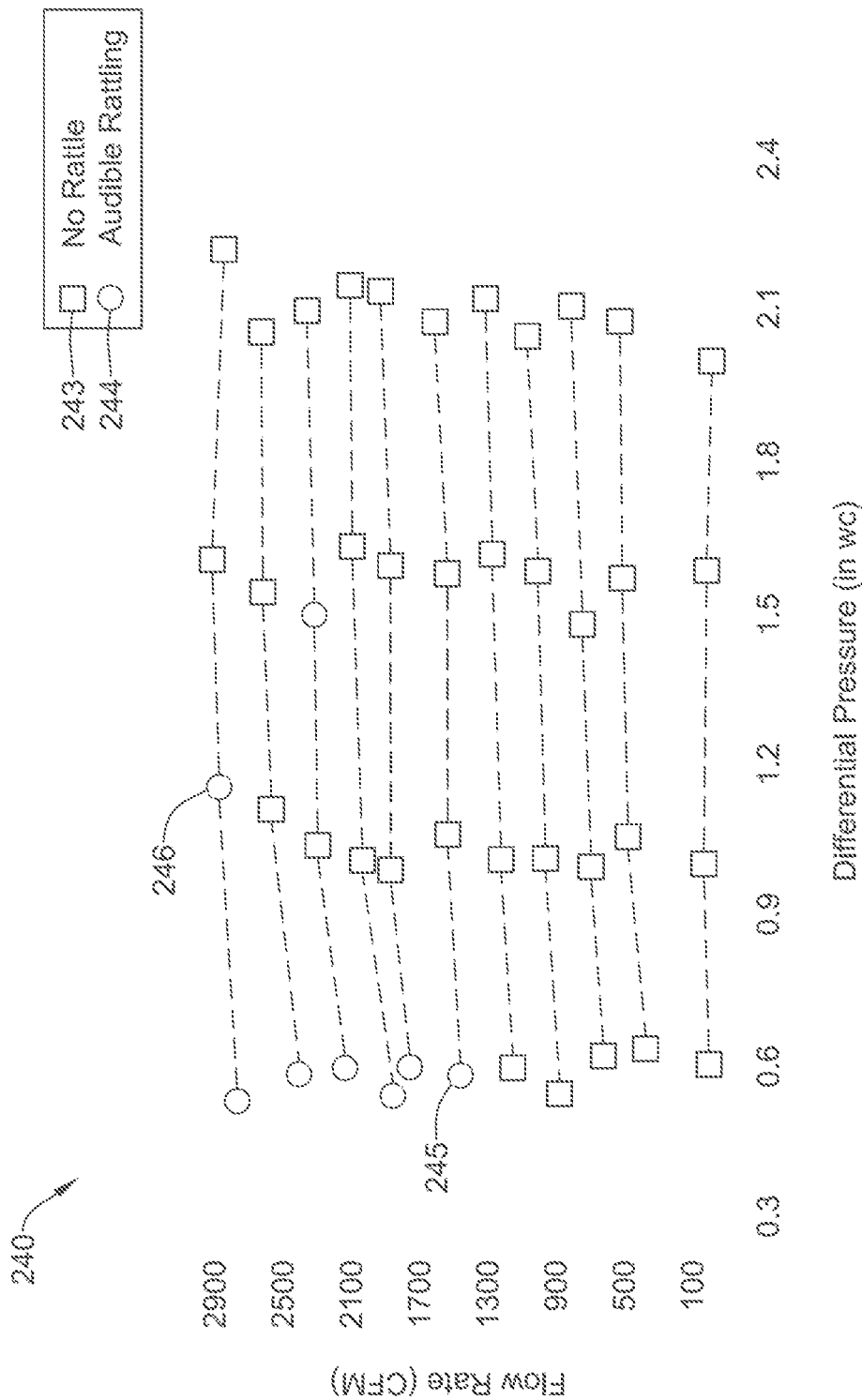
FIG. 22 is a graph illustrating points of audible rattling and no rattling at various flow rates and differential pressure of the valve member as in FIG. 9.

FIG. 22 is a graph 240 illustrating points of audible rattling 244 and no rattling 243 of the valve member 130 of FIG. 9. As shown in FIG. 9, the valve member 130 includes a reattachment region 135. In summary, as can be seen in the graph 240, an audible rattling 244 was first heard at a flow rate of around 1300 CFM and a differential pressure of around 0.6 inch WC, as indicated at point 245. The audible rattling 244 was still heard at a flow rate 241 of around 2800 CFM and a differential pressure of 1.1 inch WC, as indicated at point 246. When the differential pressure was increased to 2.2 inch WC, there was no audible rattling 244 across all tested flow rates. As can be seen, the valve member 130 of FIG. 9 performed significantly better than the prior art venturi valve tested in FIG. 18.

Figure 23:
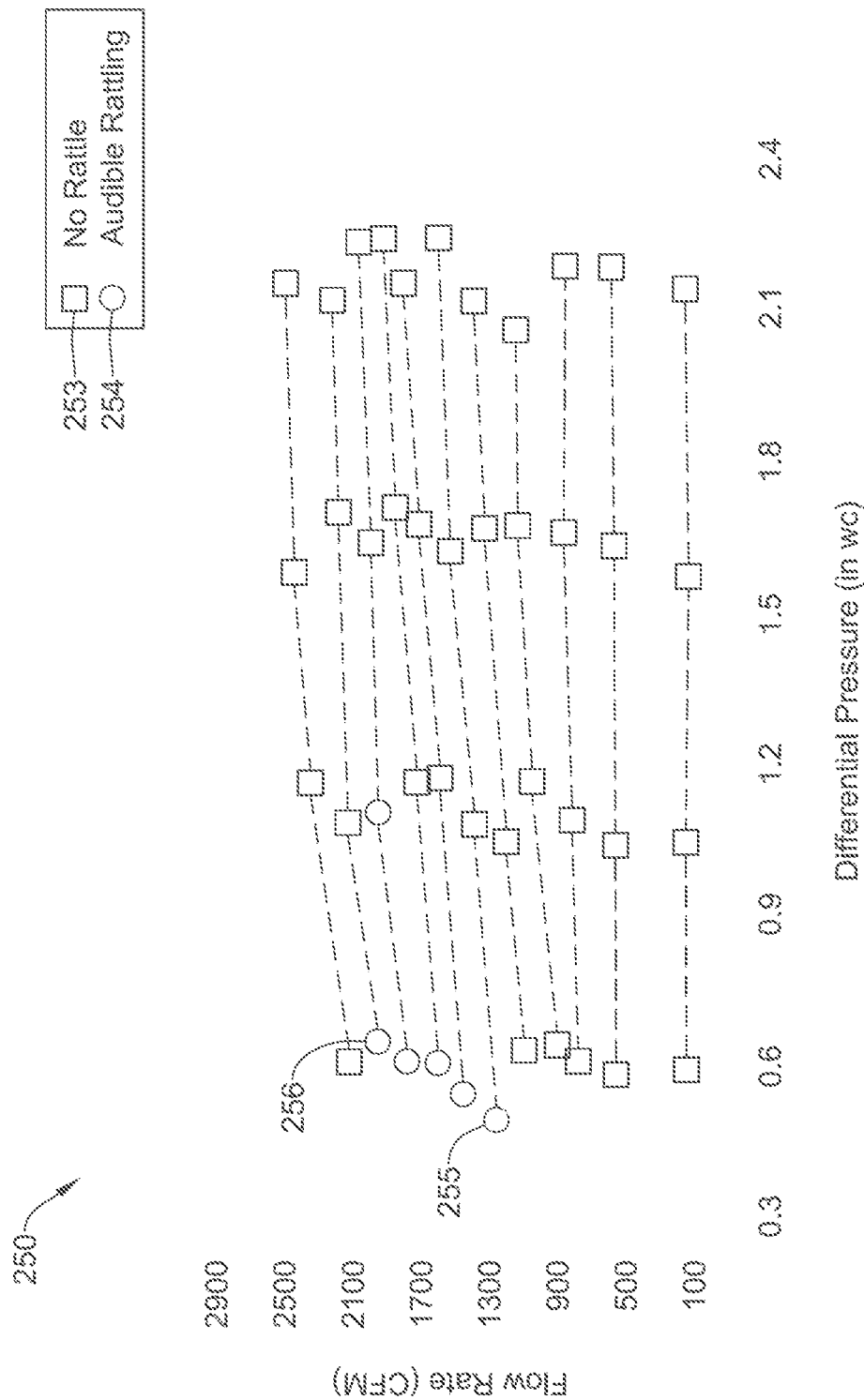
FIG. 23 is a graph illustrating points of audible rattling and no rattling at various flow rates and differential pressure of the valve member as in FIGS. 10-11.

FIG. 23 is a graph 250 illustrating points of audible rattling 254 and no rattling 253 of the valve member 140 of FIGS. 10-11. As shown in FIGS. 10-11, the valve member 140 includes a reattachment region 145 and a plurality of flow influencing features 70. The plurality of flow influencing features 70 of FIGS. 10-11 include a groove 143. In summary, as can be seen in the graph 250, an audible rattling 254 was first heard at a flow rate of around 1300 CFM and a differential pressure of around 0.5 inch WC, as indicated at point 255. The audible rattling 254 was still heard at a flow rate of around 1900 CFM and a differential pressure of 0.65 inch WC, as indicated at point 256. When the differential pressure was increased to 2.2 inch WC, there was no audible rattling 254 across all tested flow rates. As can be seen, the valve member 140 of FIGS. 10-11 performed significantly better than the prior art venturi valve tested in FIG. 18.

Figure 24:
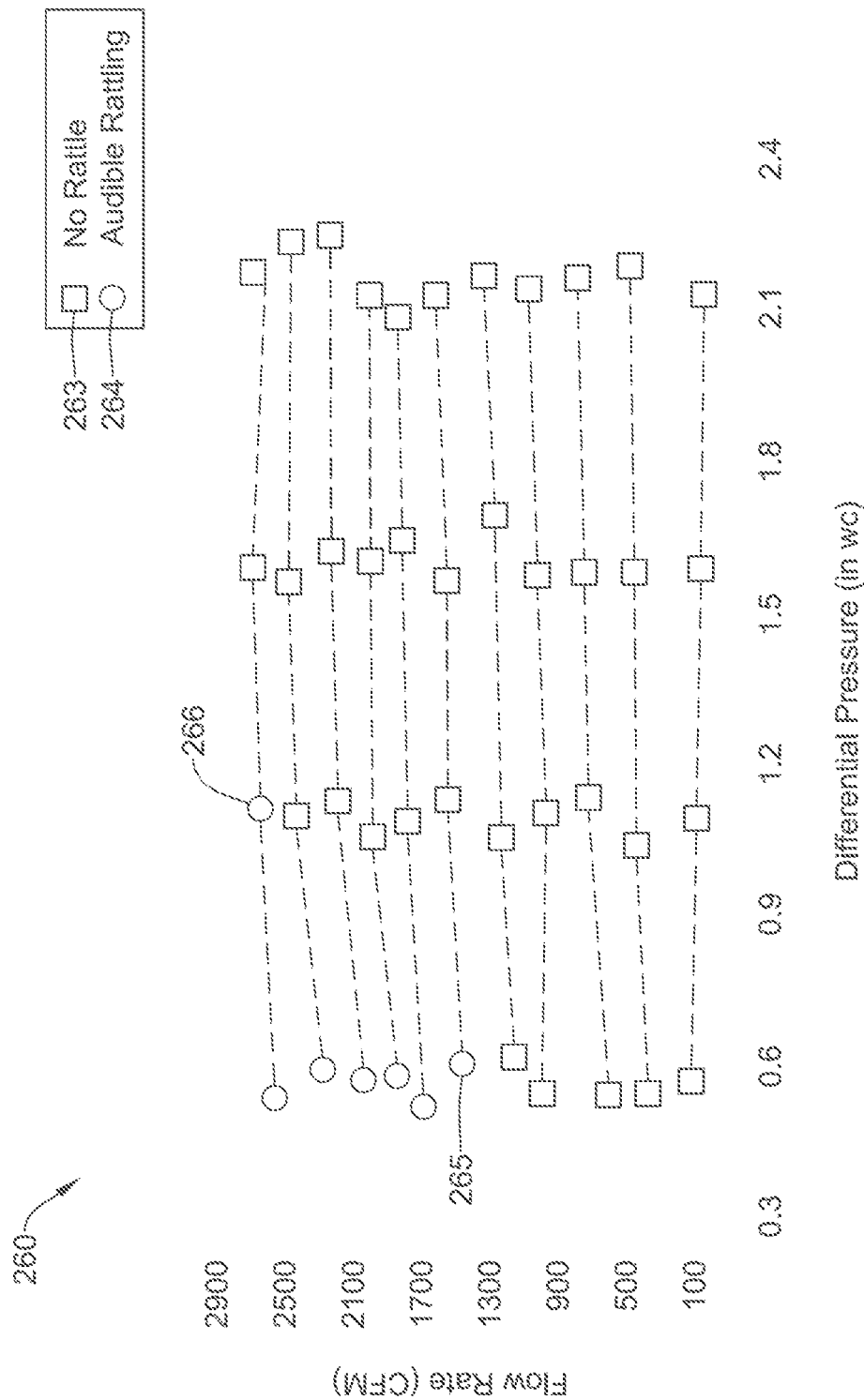
FIG. 24 is a graph illustrating points of audible rattling and no rattling at various flow rates and differential pressure of the valve member as in FIG. 12.

FIG. 24 is a graph 260 illustrating points of audible rattling 264 and no rattling 263 of the valve member 150 of FIG. 12. As shown in FIG. 12, the valve member 150 includes a reattachment region 155 and a plurality of flow influencing features 70. The plurality of flow influencing features 70 of FIG. 12 include a plurality of riblets 153. In summary, as can be seen in the graph 260, an audible rattling 264 was first heard at a flow rate of around 1500 CFM and a differential pressure of around 0.5 inch WC, as indicated at point 265. The audible rattling 264 was still heard at a flow rate of around 2500 CFM and a differential pressure of 1.0 inch WC, as indicated at point 266. When the differential pressure was increased to 2.2 inch WC, there was no audible rattling 264 across all tested flow rates. As can be seen, the valve member 150 of FIG. 12 performed significantly better than the prior art venturi valve tested in FIG. 18.

FIG. 25 is a graph 270 illustrating points of audible rattling 274 and no rattling 273 of the valve throat 520 of FIG. 14. As shown in FIG. 14, the valve throat 520 includes the plurality of flow influencing features 70. The plurality of flow influencing features 570 of FIG. 14 include a plurality of protrusions 563. In summary, as can be seen in the graph 270, an audible rattling 274 was first heard at a flow rate of around 2000 CFM and a differential pressure of around 1.0 inch WC, as indicated at point 275. The audible rattling 274 was still heard at a flow rate of around 1900 CFM and a differential pressure of 1.1 inch WC, as indicated at point 276. When the differential pressure was increased to 2.1 inch WC, there was no audible rattling 274 across all tested flow rates.

Figure 26:
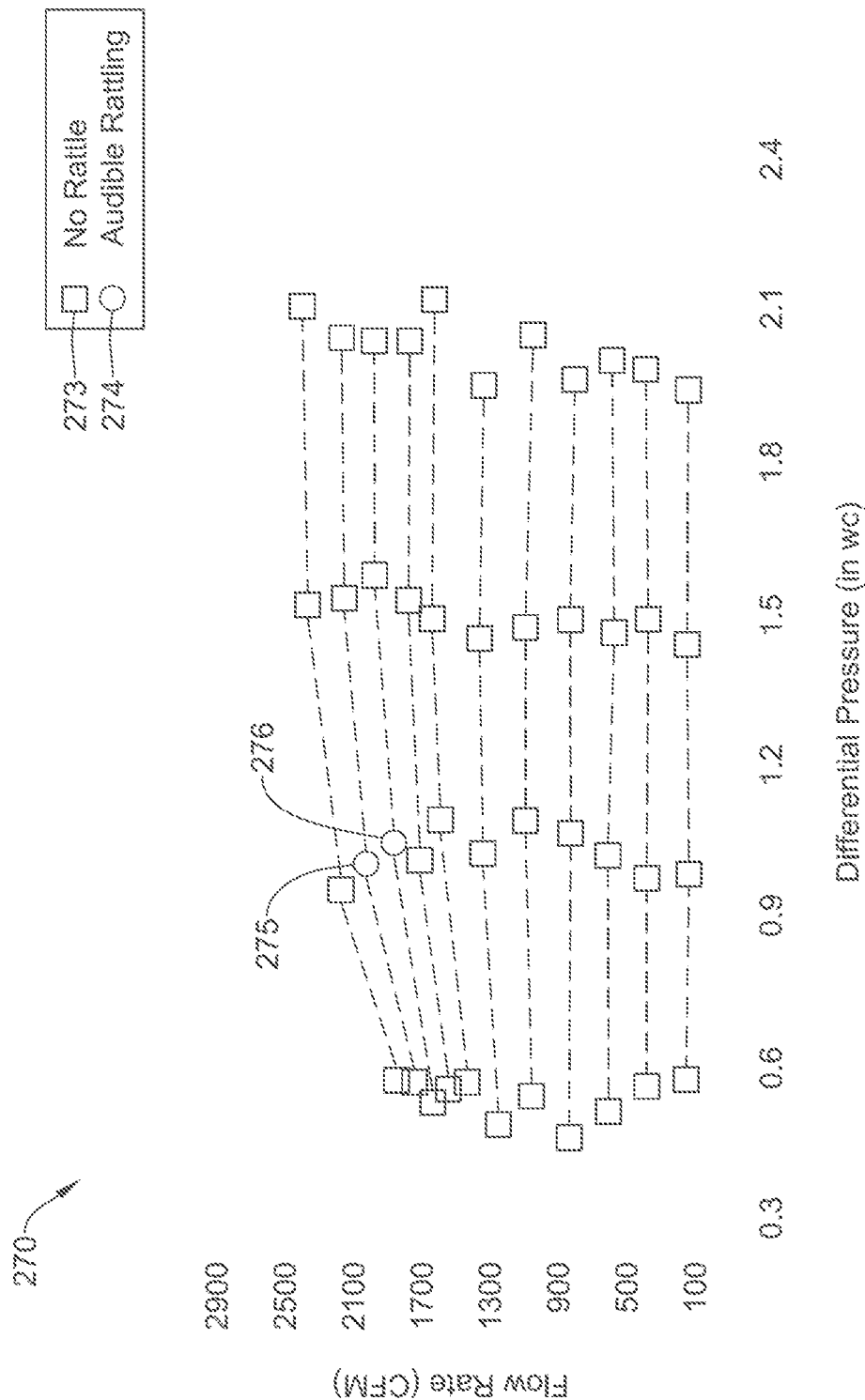
FIG. 26 is a graph illustrating points of audible rattling and no rattling at various flow rates and differential pressure of the valve throat as in FIG. 15.
Figure 26:
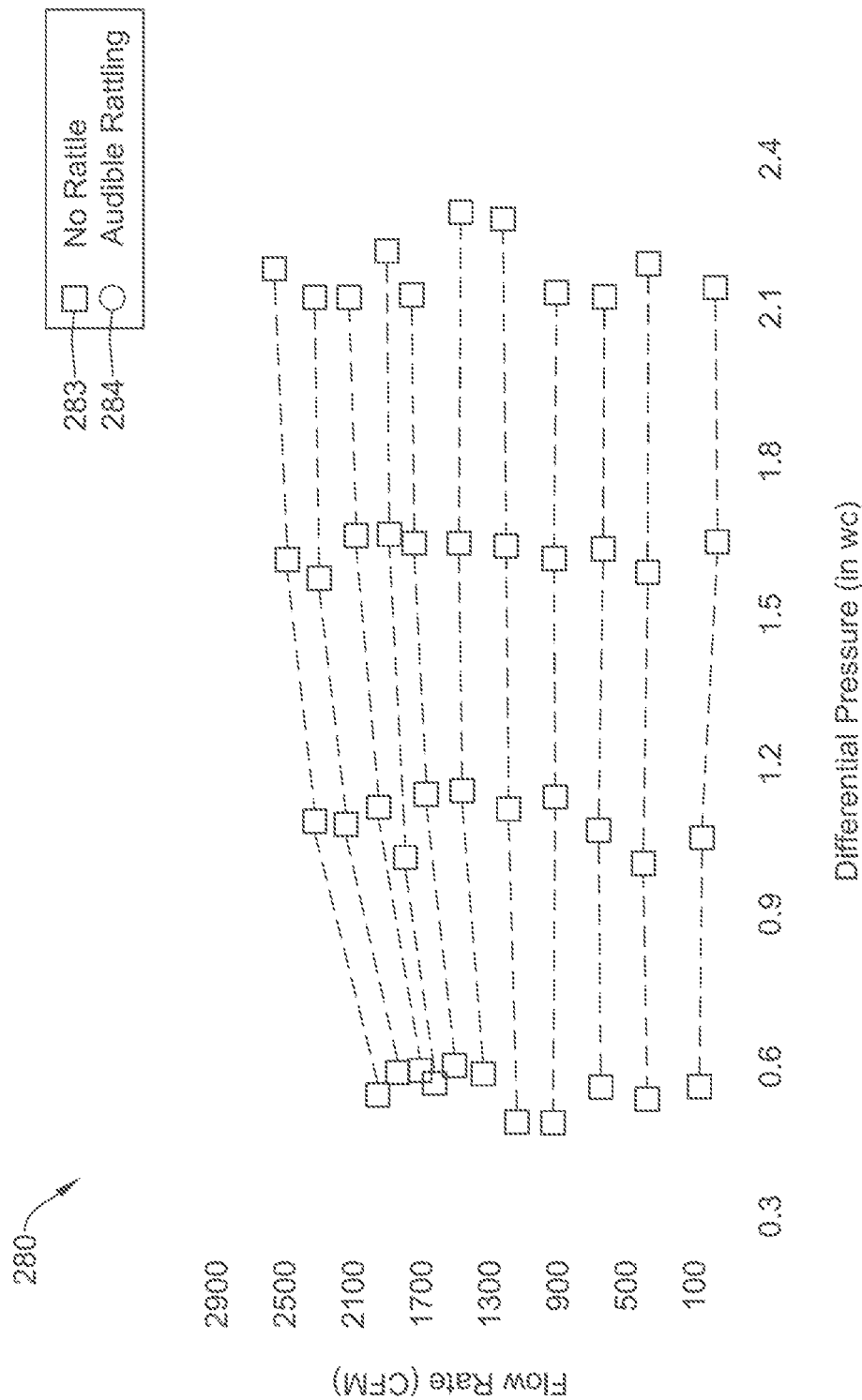

FIG. 26 is a graph 280 illustrating points of audible rattling 284 and no rattling 283 of the valve throat 520 of FIG. 15. As shown in FIG. 15, the valve throat 520 includes the plurality of flow influencing features 570. The plurality of flow influencing features 570 of FIG. 15 include a plurality of protrusions 573, wherein the plurality of protrusions 573 are staggered. In summary, as can be seen in the graph 280, there is no audible rattling 284 across all tested flow rates, ranging from 100 CFM to 2400 CFM, and all tested differential pressures, ranging from 0.5 WC to 2.3 WC.

Figure 27:
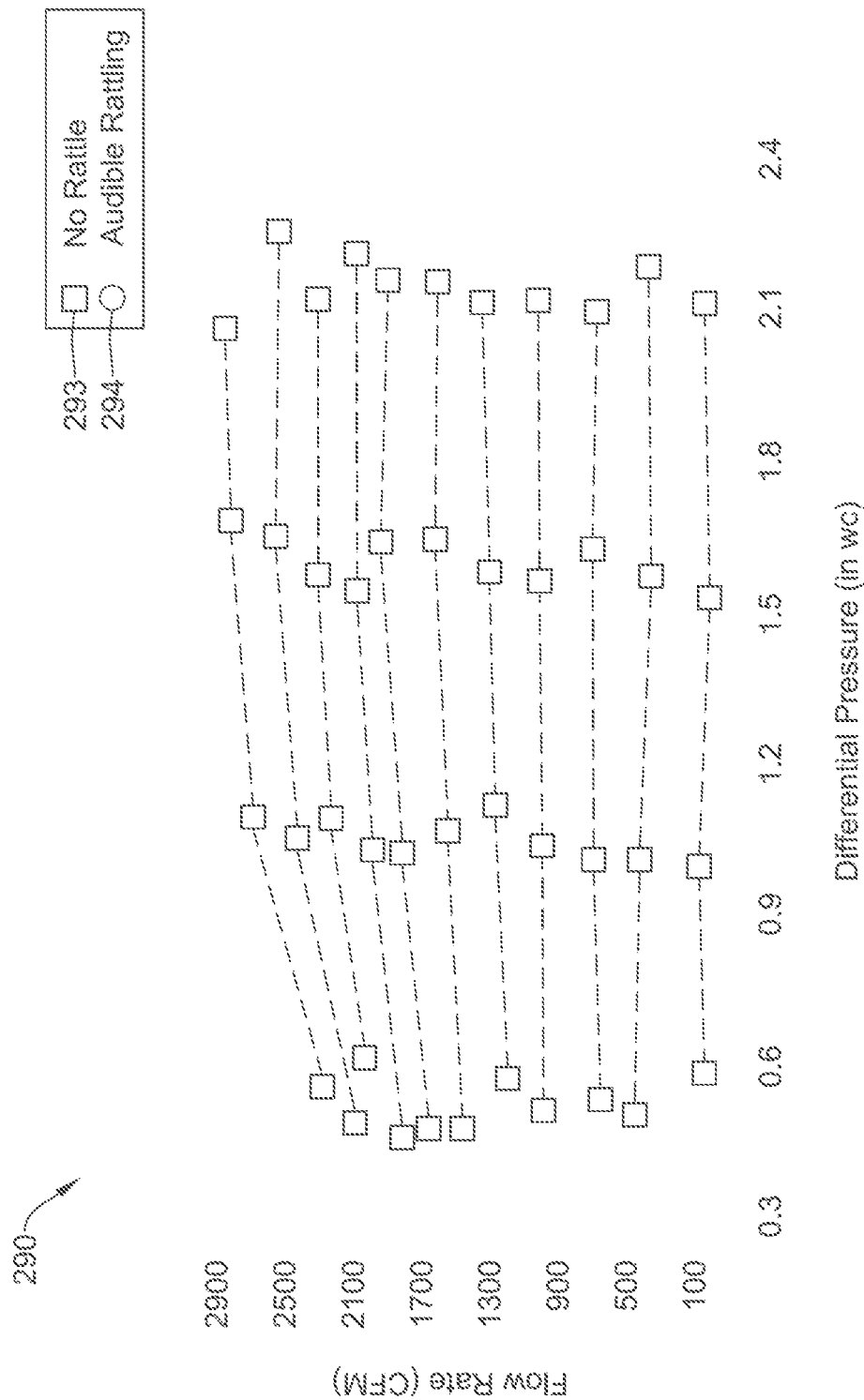
FIG. 27 is a graph illustrating points of audible rattling and no rattling at various flow rates and differential pressure of the valve throat and the valve member as in FIGS. 16-17.

FIG. 27 is a graph 290 illustrating points of audible rattling 294 and no rattling 293 of the valve throat 520 and the valve member 580 as in FIGS. 16-17. As shown in FIGS. 16-17, the valve throat 520 includes the plurality of flow influencing features 570, and the valve member 580 includes the plurality of protrusions 583. The plurality of flow influencing features 570 of FIGS. 16-17 include a plurality of protrusions 584. In summary, as can be seen in the graph 290, there is no audible rattling 294 across all tested flow rates, ranging from 100 CFM to 2600 CFM, and all tested differential pressures, ranging from 0.5 WC to 2.3 WC.

Figure 28A:
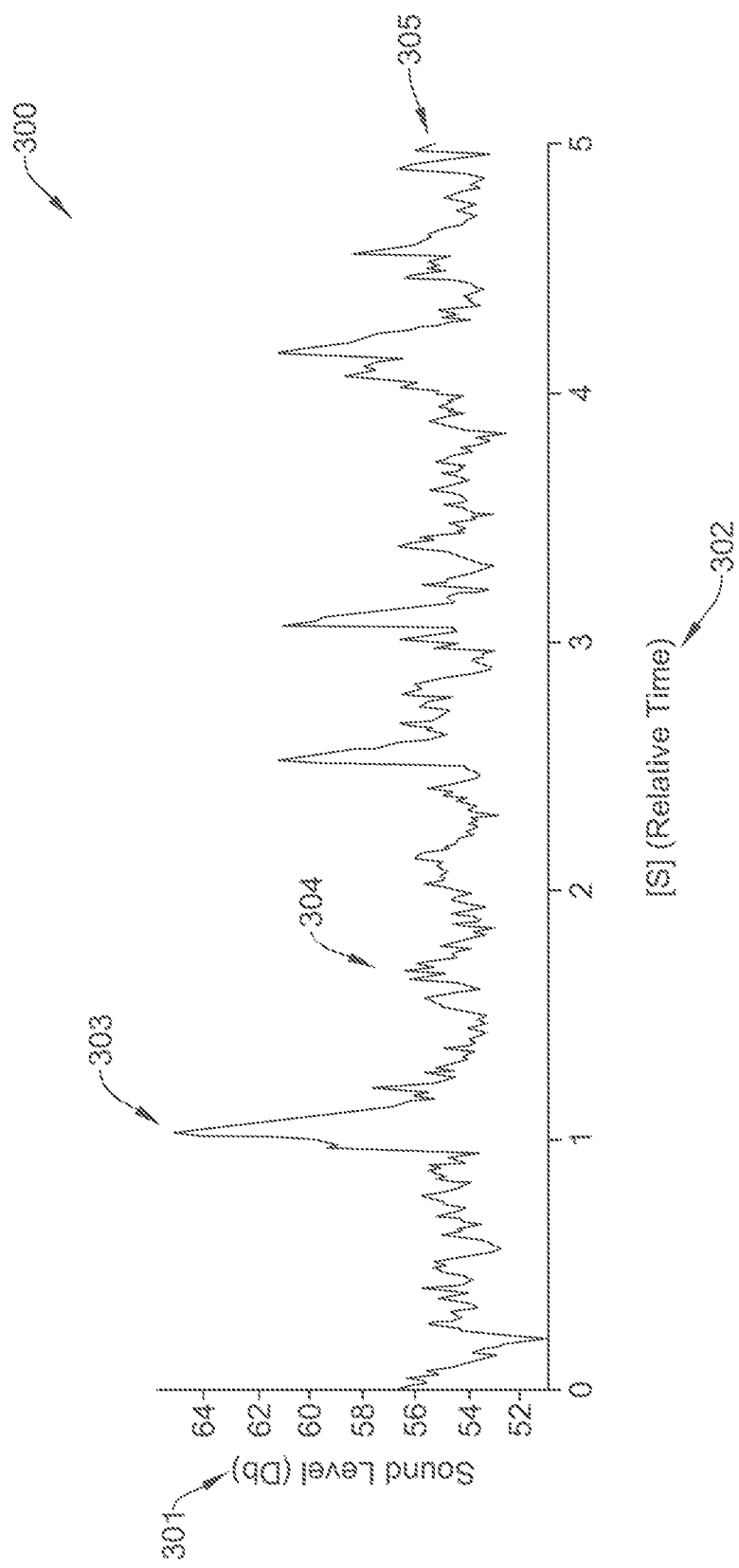
FIG. 28A is a wave graph illustrating a level of sound created over time by the valve member as in FIGS. 1-3.

FIG. 28A is a wave graph 300 illustrating a level of sound 301, which is measured in decibels (dB), created over time 302, which is measured in seconds (s), for the valve member 40 of FIGS. 1-3, where the valve member 40 does not include a reattachment region and/or flow influencing features and the valve housing does not include flow influencing features. That is, the data shown in FIG. 28A is taken on a prior art venturi valve that does not have any of the benefits disclosed by the present disclosure.

Figure 28B:
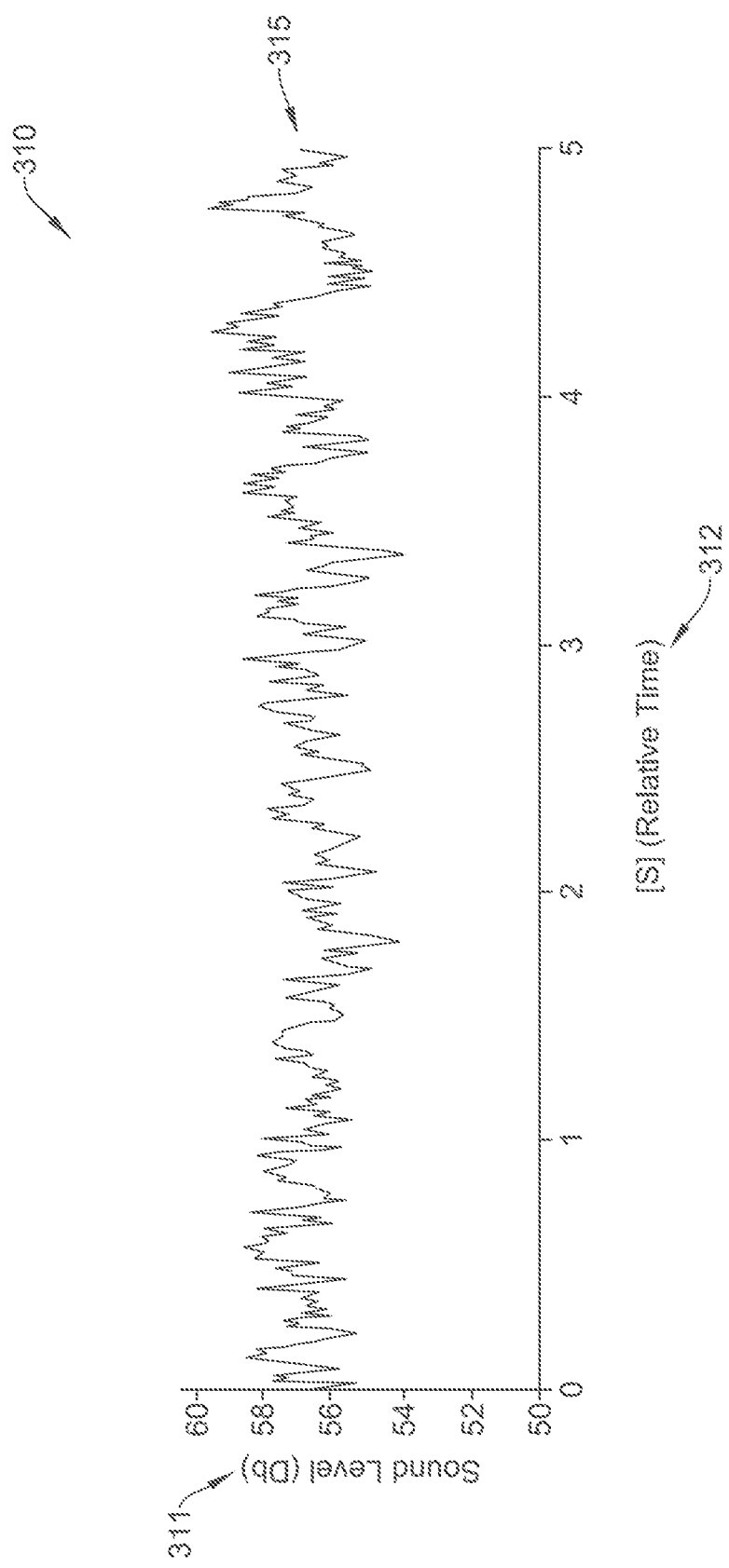
FIG. 28B is a wave graph illustrating a level of sound created over time by the valve member as in FIGS. 4-5.

As shown in FIG. 28A, a soundwave 305 hovers around 52 to 56 dB, as indicated at 304. In some cases, an audible rattling occurs, as indicated by a crest 303. The wave graph 300 may include various crests, which indicate audible rattling. As shown in the wave graph 300, audible rattling occurred at least four times within a five second time 302 period. In contrast, as shown in FIG. 28B, which is a wave graph 310 illustrating a level of sound 311 created over time 312, by the valve member 80, as in FIGS. 4-5, the soundwave 315 hovers within a range of 55 dB to 59 dB over a five second time 312 period. As shown in FIG. 28B, there is no significant audible rattling produced by the venturi valve when the valve member 80 is used.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A valve apparatus comprising:
 a venturi valve housing that houses a valve member, wherein the valve member is movable in an axial direction of the valve housing, the valve member including:
  a maximum width region that defines a maximum width of the valve member;
  a first region downstream of the maximum width region;
  a second region downstream of the first region;
  wherein the first region tapers radially inward, the second region tapers radially inward from the first region, and wherein the first region and the second region do not have the same taper; and
  wherein the first region includes a plurality of distinct flow influencing features including a plurality of protrusions.

2. The valve apparatus of claim 1, wherein the valve member has a central axis extending centrally along the length of the valve member, and wherein the first region has an upstream end and a downstream end with an angle in the range of 5 and 40 degrees between:
 a first axis extending out from the upstream end of the first region and parallel with the central axis of the valve member; and
 a second axis intersecting the first line at the upstream end of the first region, extending to the downstream end of the first region, and intersecting the central axis of the valve member.

3. The valve apparatus of claim 2, wherein the angle is in the range of 25 to 35 degrees.

4. The valve apparatus of claim 1, further comprising an upstream region upstream of the maximum width region, wherein the upstream region has a curved shaped diverting air flow towards the maximum width region.

5. The valve apparatus of claim 4, wherein the upstream region is domed shaped.

6. The valve apparatus of claim 1, wherein the first region has a length of at least one inch.

7. The valve apparatus of claim 1, wherein the second region tapers radially inward more than the first region.

8. A valve apparatus comprising:
 a venturi valve housing that houses a valve member, wherein the valve member is movable in an axial direction of the valve housing, the valve member including:
  a maximum width region that defines a maximum width of the valve member;
  a first region downstream of the maximum width region;
  a second region downstream of the first region;
  wherein the first region tapers radially inward, the second region tapers radially inward from the first region, and wherein the first region and the second region do not have the same taper; and
  wherein the first region includes a plurality of distinct flow influencing features including a plurality of dimples.

9. The valve apparatus of claim 8, wherein the valve member has a central axis extending centrally along the length of the valve member, and wherein the first region has an upstream end and a downstream end with an angle in the range of 5 and 40 degrees between:
 a first axis extending out from the upstream end of the first region and parallel with the central axis of the valve member; and
 a second axis intersecting the first line at the upstream end of the first region, extending to the downstream end of the first region, and intersecting the central axis of the valve member.

10. The valve apparatus of claim 9, wherein the angle is in the range of 25 to 35 degrees.

11. The valve apparatus of claim 8, further comprising an upstream region upstream of the maximum width region, wherein the upstream region has a curved shaped diverting air flow towards the maximum width region.

12. The valve apparatus of claim 11, wherein the upstream region is domed shaped.

13. The valve apparatus of claim 8, wherein the first region has a length of at least one inch.

14. The valve apparatus of claim 8, wherein the second region tapers radially inward more than the first region.

15. A valve apparatus comprising:
 a venturi valve housing that houses a valve member, wherein the valve member is movable in an axial direction of the valve housing, the valve member including:
  a maximum width region that defines a maximum width of the valve member;

a first region downstream of the maximum width region;

a second region downstream of the first region;

wherein the first region tapers radially inward, the second region tapers radially inward from the first region, and wherein the first region and the second region do not have the same taper; and wherein the first region includes a plurality of distinct flow influencing features including a plurality of grooves and/or riblets.

16. The valve apparatus of claim 15, wherein the valve member has a central axis extending centrally along the length of the valve member, and wherein the first region has an upstream end and a downstream end with an angle in the range of 5 and 40 degrees between:

a first axis extending out from the upstream end of the first region and parallel with the central axis of the valve member; and a second axis intersecting the first line at the upstream end of the first region, extending to the downstream end of the first region, and intersecting the central axis of the valve member.

17. The valve apparatus of claim 16, wherein the angle is in the range of 25 to 35 degrees.

18. The valve apparatus of claim 15, wherein the first region has a length of at least one inch.

19. The valve apparatus of claim 15, wherein the second region tapers radially inward more than the first region.

20. The valve apparatus of claim 15, wherein the plurality of distinct flow influencing features include a plurality of parallel grooves, and wherein the plurality of parallel grooves extend lengthwise in a downstream direction.

* * * * *